United States Patent
Faulkinbury

(10) Patent No.: US 10,196,294 B2
(45) Date of Patent: Feb. 5, 2019

(54) SUBMERGED COMBUSTION MELTERS, WALL STRUCTURES OR PANELS OF SAME, AND METHODS OF USING SAME

(71) Applicant: JOHNS MANVILLE, Denver, CO (US)

(72) Inventor: Albert Patrick Faulkinbury, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 34 days.

(21) Appl. No.: 15/258,900

(22) Filed: Sep. 7, 2016

(65) Prior Publication Data

US 2018/0065877 A1 Mar. 8, 2018

(51) Int. Cl.
*C03B 5/235* (2006.01)
*C03B 5/44* (2006.01)
(Continued)

(52) U.S. Cl.
CPC ............ *C03B 5/2356* (2013.01); *C03B 5/167* (2013.01); *C03B 5/44* (2013.01); *F23D 14/22* (2013.01);
(Continued)

(58) Field of Classification Search
CPC .......... C03B 5/44; C03B 5/2356; C03B 5/193
See application file for complete search history.

(56) References Cited

U.S. PATENT DOCUMENTS 1,579,353 A 4/1926 Good
1,636,151 A 7/1927 Schofield
(Continued)

FOREIGN PATENT DOCUMENTS

CH 254 502 A 5/1948
DE 10 38 721 B 9/1958
(Continued)

OTHER PUBLICATIONS

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
(Continued)

*Primary Examiner* — Lisa L Herring

(74) *Attorney, Agent, or Firm* — Robert D. Touslee

(57) ABSTRACT

Submerged combustion burner panels, submerged combustion melters including one or more of the panels, and methods of using the same. The burner panel includes a panel body including a fluid-cooled portion and a protective non-fluid cooled portion. An exterior surface defined by the fluid-cooled portion, and an interior surface defined by the protective non-fluid cooled portion, exterior and interior referring to an SCM in which the panel is installed. The fluid-cooled portion has at least one burner support passage of diameter (d1) extending from the exterior surface to a seam where the fluid-cooled and protective non-fluid cooled portions meet supporting at least one fluid-cooled SC burner having a fluid-cooled burner tip attached to a burner body protruding away from the seam. The protective non-fluid-cooled portion has a combustion products flow passage of diameter (d2)<(d1). The burner panels promote burner life and melter campaign length.

32 Claims, 9 Drawing Sheets

(51) Int. Cl.
*C03B 5/167* (2006.01)
*F23D 14/22* (2006.01)
*F23D 14/76* (2006.01)
*F23D 14/78* (2006.01)

(52) U.S. Cl.
CPC .......... *F23D 14/76* (2013.01); *F23D 14/78* (2013.01); *C03B 2211/22* (2013.01); *C03B 2211/60* (2013.01)

(56) References Cited

U.S. PATENT DOCUMENTS

| | | |
|---|---|---|
| 1,679,295 A | 7/1928 | Dodge |
| 1,706,857 A | 3/1929 | Mathe |
| 1,716,433 A | 6/1929 | Ellis |
| 1,875,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,597,858 A | 5/1952 | Howard |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,499,743 A | 3/1970 | Fanica et al. |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Worner |
| 3,649,235 A | 3/1972 | Harris |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |

(56) References Cited

U.S. PATENT DOCUMENTS

| | | | |
|---|---|---|---|
| 4,545,800 A * | 10/1985 | Won | C03B 5/2356 65/134.4 |
| 4,549,896 A | 10/1985 | Streicher et al. | |
| 4,599,100 A | 7/1986 | Demarest | |
| 4,622,007 A | 11/1986 | Gitman | |
| 4,626,199 A | 12/1986 | Bounini | |
| 4,632,687 A | 12/1986 | Kunkle et al. | |
| 4,634,461 A | 1/1987 | Demarest, Jr. et al. | |
| 4,657,586 A | 4/1987 | Masterson et al. | |
| 4,718,931 A | 1/1988 | Boettner | |
| 4,723,708 A | 2/1988 | Berger et al. | |
| 4,735,642 A | 4/1988 | Jensen et al. | |
| 4,738,938 A | 4/1988 | Kunkle et al. | |
| 4,758,259 A | 7/1988 | Jensen | |
| 4,780,122 A | 10/1988 | Schwenninger et al. | |
| 4,794,860 A | 1/1989 | Welton | |
| 4,798,616 A | 1/1989 | Knavish et al. | |
| 4,812,372 A | 3/1989 | Kithany | |
| 4,814,387 A | 3/1989 | Donat | |
| 4,816,056 A | 3/1989 | Tsai et al. | |
| 4,818,265 A | 4/1989 | Krumwiede et al. | |
| 4,877,436 A | 10/1989 | Sheinkop | |
| 4,877,449 A | 10/1989 | Khinkis | |
| 4,878,829 A | 11/1989 | Anderson | |
| 4,882,736 A | 11/1989 | Pieper | |
| 4,886,539 A | 12/1989 | Gerutti et al. | |
| 4,900,337 A | 2/1990 | Zortea et al. | |
| 4,919,700 A | 4/1990 | Pecoraro et al. | |
| 4,927,386 A | 5/1990 | Backderf et al. | |
| 4,932,035 A | 6/1990 | Pieper | |
| 4,953,376 A | 9/1990 | Merlone | |
| 4,963,731 A | 10/1990 | King | |
| 4,969,942 A | 11/1990 | Schwenninger et al. | |
| 4,973,346 A | 11/1990 | Kobayashi et al. | |
| 5,011,086 A | 4/1991 | Sonnleitner | |
| 5,032,230 A | 7/1991 | Shepherd | |
| 5,052,874 A | 10/1991 | Johanson | |
| 5,062,789 A | 11/1991 | Gitman | |
| 5,097,802 A | 3/1992 | Clawson | |
| 5,168,109 A | 12/1992 | Backderf et al. | |
| 5,169,424 A | 12/1992 | Grinnen et al. | |
| 5,194,747 A | 3/1993 | Culpepper et al. | |
| 5,199,866 A | 4/1993 | Joshi et al. | |
| 5,204,082 A | 4/1993 | Schendel | |
| 5,299,929 A | 4/1994 | Yap | |
| 5,360,171 A | 11/1994 | Yap | |
| 5,374,595 A | 12/1994 | Dumbaugh et al. | |
| 5,405,082 A | 4/1995 | Brown et al. | |
| 5,412,882 A | 5/1995 | Zippe et al. | |
| 5,449,286 A | 9/1995 | Snyder et al. | |
| 5,473,885 A | 12/1995 | Hunter, Jr. et al. | |
| 5,483,548 A | 1/1996 | Coble | |
| 5,490,775 A | 2/1996 | Joshi et al. | |
| 5,522,721 A | 6/1996 | Drogue et al. | |
| 5,545,031 A | 8/1996 | Joshi et al. | |
| 5,575,637 A | 11/1996 | Slavejkov et al. | |
| 5,586,999 A | 12/1996 | Kobayashi | |
| 5,595,703 A | 1/1997 | Swaelens et al. | |
| 5,606,965 A | 3/1997 | Panz et al. | |
| 5,613,994 A | 3/1997 | Muniz et al. | |
| 5,615,668 A | 4/1997 | Panz et al. | |
| 5,636,623 A | 6/1997 | Panz et al. | |
| 5,672,827 A | 9/1997 | Jursich | |
| 5,713,668 A | 2/1998 | Lunghofer et al. | |
| 5,718,741 A | 2/1998 | Hull et al. | |
| 5,724,901 A | 3/1998 | Guy et al. | |
| 5,736,476 A | 4/1998 | Watzke et al. | |
| 5,743,723 A | 4/1998 | Iatrides et al. | |
| 5,765,964 A | 6/1998 | Calcote et al. | |
| 5,814,121 A | 9/1998 | Travis | |
| 5,829,962 A | 11/1998 | Drasek et al. | |
| 5,833,447 A | 11/1998 | Bodelin et al. | |
| 5,849,058 A | 12/1998 | Takeshita et al. | |
| 5,863,195 A | 1/1999 | Feldermann | |
| 5,887,978 A | 3/1999 | Lunghofer et al. | |
| 5,944,507 A | 8/1999 | Feldermann | |
| 5,944,864 A | 8/1999 | Hull et al. | |
| 5,954,498 A | 9/1999 | Joshi et al. | |
| 5,975,886 A | 11/1999 | Phillippe | |
| 5,979,191 A | 11/1999 | Jian | |
| 5,984,667 A | 11/1999 | Phillippe et al. | |
| 5,993,203 A | 11/1999 | Koppang | |
| 6,029,910 A | 2/2000 | Joshi et al. | |
| 6,036,480 A | 3/2000 | Hughes et al. | |
| 6,039,787 A | 3/2000 | Edlinger | |
| 6,044,667 A | 4/2000 | Chenoweth | |
| 6,045,353 A | 4/2000 | VonDrasek et al. | |
| 6,068,468 A | 5/2000 | Phillipe et al. | |
| 6,071,116 A | 6/2000 | Phillipe et al. | |
| 6,074,197 A | 6/2000 | Phillippe | |
| 6,077,072 A | 6/2000 | Marin et al. | |
| 6,085,551 A | 7/2000 | Pieper et al. | |
| 6,109,062 A | 8/2000 | Richards | |
| 6,113,389 A | 9/2000 | Joshi et al. | |
| 6,116,896 A | 9/2000 | Joshi et al. | |
| 6,120,889 A | 9/2000 | Turner et al. | |
| 6,123,542 A | 9/2000 | Joshi et al. | |
| 6,126,438 A | 10/2000 | Joshi et al. | |
| 6,154,481 A | 11/2000 | Sorg et al. | |
| 6,156,285 A | 12/2000 | Adams et al. | |
| 6,171,100 B1 | 1/2001 | Joshi et al. | |
| 6,178,777 B1 | 1/2001 | Chenoweth | |
| 6,183,848 B1 | 2/2001 | Turner et al. | |
| 6,210,151 B1 | 4/2001 | Joshi et al. | |
| 6,210,703 B1 | 4/2001 | Novich | |
| 6,237,369 B1 | 5/2001 | LeBlanc et al. | |
| 6,241,514 B1 | 6/2001 | Joshi et al. | |
| 6,244,197 B1 | 6/2001 | Coble | |
| 6,244,857 B1 | 6/2001 | VonDrasek et al. | |
| 6,247,315 B1 | 6/2001 | Marin et al. | |
| 6,250,136 B1 | 6/2001 | Igreja | |
| 6,250,916 B1 | 6/2001 | Phillipe et al. | |
| 6,274,164 B1 | 8/2001 | Novich | |
| 6,276,924 B1 | 8/2001 | Joshi et al. | |
| 6,276,928 B1 | 8/2001 | Joshi et al. | |
| 6,293,277 B1 | 9/2001 | Panz et al. | |
| 6,314,760 B1 | 11/2001 | Chenoweth | |
| 6,314,896 B1 | 11/2001 | Marin et al. | |
| 6,318,126 B1 | 11/2001 | Takei et al. | |
| 6,332,339 B1 | 12/2001 | Kawaguchi et al. | |
| 6,338,337 B1 | 1/2002 | Panz et al. | |
| 6,339,610 B1 | 1/2002 | Hoyer et al. | |
| 6,344,747 B1 | 2/2002 | Lunghofer et al. | |
| 6,357,264 B1 | 3/2002 | Richards | |
| 6,386,271 B1 | 5/2002 | Kawamoto et al. | |
| 6,398,547 B1 | 6/2002 | Joshi et al. | |
| 6,404,799 B1 | 6/2002 | Mori et al. | |
| 6,418,755 B2 | 7/2002 | Chenoweth | |
| 6,422,041 B1 | 7/2002 | Simpson et al. | |
| 6,454,562 B1 | 9/2002 | Joshi et al. | |
| 6,460,376 B1 | 10/2002 | Jeanvoine et al. | |
| 6,470,710 B1 | 10/2002 | Takei et al. | |
| 6,536,238 B2 | 3/2003 | Kawaguchi et al. | |
| 6,536,651 B2 | 3/2003 | Ezumi et al. | |
| 6,558,606 B1 | 5/2003 | Kulkarni et al. | |
| 6,578,779 B2 | 6/2003 | Dion | |
| 6,660,106 B1 | 12/2003 | Babel et al. | |
| 6,694,791 B1 | 2/2004 | Johnson et al. | |
| 6,701,617 B2 | 3/2004 | Li et al. | |
| 6,701,751 B2 | 3/2004 | Arechaga et al. | |
| 6,705,118 B2 | 3/2004 | Simpson et al. | |
| 6,708,527 B1 | 3/2004 | Ibarlucea et al. | |
| 6,711,942 B2 | 3/2004 | Getman et al. | |
| 6,715,319 B2 | 4/2004 | Barrow et al. | |
| 6,722,161 B2 | 4/2004 | LeBlanc | |
| 6,736,129 B1 | 5/2004 | Sjith | |
| 6,739,152 B2 | 5/2004 | Jeanvoine et al. | |
| 6,796,147 B2 | 9/2004 | Borysowicz et al. | |
| 6,797,351 B2 | 9/2004 | Kulkarni et al. | |
| 6,854,290 B2 | 2/2005 | Hayes et al. | |
| 6,857,999 B2 | 2/2005 | Jeanvoine | |
| 6,883,349 B1 | 4/2005 | Jeanvoine | |
| 6,918,256 B2 | 7/2005 | Gutmark et al. | |
| 7,027,467 B2 | 4/2006 | Baev et al. | |

(56) References Cited

U.S. PATENT DOCUMENTS

| | | |
|---|---|---|
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdahl |
| 2005/0236747 A1 | 10/2005 | Rue et al. |
| 2006/0000239 A1 | 1/2006 | Jeanvoine et al. |
| 2006/0057517 A1* | 3/2006 | Joshi .................. C03B 5/235 431/12 |
| 2006/0101859 A1 | 5/2006 | Takagi et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0016922 A1 | 1/2011 | Kitamura et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0090421 A1 | 4/2014 | Shock et al. |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |

(56) References Cited

U.S. PATENT DOCUMENTS

| | | |
|---|---|---|
| 2016/0116214 A1 | 4/2016 | Kirschen |
| 2016/0221854 A1* | 8/2016 | Carolla .................... C03B 5/42 |

FOREIGN PATENT DOCUMENTS

| | | | |
|---|---|---|---|
| DE | 11 05 116 B | 4/1961 | |
| DE | 36 29 965 A1 | 3/1988 | |
| DE | 40 00 358 C2 | 3/1993 | |
| DE | 44 24 814 A1 | 1/1996 | |
| DE | 196 19 919 A1 | 8/1997 | |
| DE | 100 29 983 A1 | 1/2002 | |
| DE | 100 29 983 C2 | 9/2003 | |
| DE | 10 2005 033330 B3 | 8/2006 | |
| EP | 0 181 248 B1 | 10/1989 | |
| EP | 1 337 789 B1 | 12/2004 | |
| EP | 1 990 321 A1 | 11/2008 | |
| EP | 2 133 315 A1 | 12/2009 | |
| EP | 2 138 465 A2 | 12/2009 | |
| EP | 1 986 966 B1 | 4/2010 | |
| EP | 2 397 446 A2 | 12/2011 | |
| EP | 2 404 880 A1 | 1/2012 | |
| EP | 2 433 911 A1 | 3/2012 | |
| EP | 2 578 548 A2 | 4/2013 | |
| FR | 2 740 860 A1 | 9/1997 | |
| GB | 191301772 | 1/1914 | |
| GB | 191407633 | 3/1914 | |
| GB | 164073 A | 5/1921 | |
| GB | 250 536 A | 7/1926 | |
| GB | 959 895 A | 6/1964 | |
| GB | 1449439 | 9/1976 | |
| GB | 1 514 317 A | 6/1978 | |
| GB | 2 424 644 A | 10/2006 | |
| IT | 1208172 | 7/1989 | |
| JP | S58 199728 A | 11/1983 | |
| JP | H08 290918 A | 11/1996 | |
| KR | 2000 0050572 A | 8/2000 | |
| KR | 100465272 B1 | 12/2004 | |
| RO | 114827 | 7/1999 | |
| SU | 986873 A1 | 7/1983 | |
| WO | 1998055411 A1 | 12/1998 | |
| WO | 2008103291 A1 | 8/2008 | |
| WO | 2009091558 A1 | 7/2009 | |
| WO | 2010011701 A2 | 1/2010 | |
| WO | 2010045196 A3 | 4/2010 | |
| WO | 1 667 934 B1 | 2/2011 | |
| WO | 2012048790 A1 | 4/2012 | |
| WO | 2012125665 A1 | 9/2012 | |
| WO | 2013 162986 A1 | 10/2013 | |
| WO | 2013 188082 A1 | 12/2013 | |
| WO | 2013188167 A1 | 12/2013 | |
| WO | WO-2014189502 A1 * | 11/2014 | ............. F23C 3/004 |
| WO | WO-2014193390 A1 * | 12/2014 | ........... C03B 5/2353 |

OTHER PUBLICATIONS

Gerber, J., "Les Densimetres Industriels," Petrole et Techniques, Association Francaise des Techniciens du Petrole, Jun. 1, 1989, pp. 26-27, No. 349, Paris, France.

Rue et al, "Submerged Combustion Melting of Glass," International Journal of Applied Gass Science, Nov. 9, 2011, pp. 262-274, vol. 2, No. 4.

National Laboratory, US DOE Contract No. DE-AC09-08SR22470, Oct. 2011.

"AccuTru Temperature Measurement," AccuTru International Corporation, 2003.

"Glass Technologies—The Legacy of a Successful Public-Private Partnership", 2007, U.S. Department of Energy, pp. 1-32.

"Glass Melting Technology—A Technical and Economic Assessment," 2004, U.S. Department of Energy, pp. 1-292.

Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", In A Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.

Rue, "Energy-Efficient Glass Melting—The Next Generation Melter", Gas Technology Institute, Project No. 20621 Final Report (2008).

Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.

Sims, Richard, "Batch charging technologies—a review", www.glassonweb.com, Nikolaus Sorg Gmbh & Co KG (May 2011).

"Canty Process Technology" brochure, date unknown, received in Apr. 2012 at American Institute of Chemical Engineers, Spring Meeting, Houston, TX.

"Glass Melting", Battelle PNNL MST Handbook, U.S. Department of Energy, Pacific Northwest Laboratory, retrieved from the Internet Apr. 20, 2012.

"Roll Compaction", brochure from the Fitzpatrick Company, Elmhurst, Illinois, retrieved from the Internet Apr. 20, 2012.

"Glass industry of the Future", United States Department of Energy, report 02-GA50113-03, pp. 1-17, Sep. 30, 2008.

Stevenson, "Foam Engineering: Fundamentals and Applications", Chapter 16, pp. 36-389, John Wiley & Sons (Mar. 13, 2012).

Clare et al., "Density and Surface Tension of Borate Containing Silicate Melts", Glass Technology—European Journal of Glass Science and Technology, Part A, pp. 59-62, vol. 44, No. 2, Apr. 1, 2003.

Seward, T.P., "Modeling of Glass Making Processes for Improved Efficiency", DE-FG07-96EE41262, Final Report, Mar. 31, 2003.

Conradt et al, Foaming behavior on glass melts, Glastechniche Berichte 60 (1937) Nr. 6, S. 189-201 Abstract Fraunhofer ISC.

Kim et al., "Foaming in Glass Melts Produced by Sodium Sulfate Decomposition under Isothermal Conditions", Journal of the American Ceramic Society, 74(3), pp. 551-555, 1991.

Kim et al., "Foaming in Glass Melts Produced by Sodium Sulfate Decomposition under Ramp Heating Conditions", Journal of the American Ceramic Society, 75(11), pp. 2959-2963, 1992.

Kim et al., "Effect of Furnace Atmosphere on E-glass Foaming", Journal of Non-Crystalline Solids, 352(50/51), pp. 5287-5295, 2006.

Van Limpt et al., "Modelling the evaporation of boron species. Part 1. Alkali-free borosilicate glass melts", Glass Technology—European Journal of Glass Science and Technology, Part A, 52(3): pp. 77-87, 2011.

Olabin, V.M. et al. "Submerged Combustion Furnace for Glass Melts," Ceramic Engineering and Science Proceedings, Jan. 1, 1996, pp. 84-92, vol. 17—No. 2, American Ceramic Society Inc., US.

* cited by examiner

602
Feeding one or more non-metallic inorganic material feedstocks into a submerged combustion melter (SCM) comprising a combustion burner panel comprising
 (a) a panel body comprising a fluid-cooled portion and a protective non-fluid cooled portion, an exterior surface defined by the fluid-cooled portion, and an interior surface defined by the protective non-fluid cooled portion, wherein exterior and interior refer to an SCM in which the panel is installed;
 (b) the fluid-cooled portion having at least one burner support passage of diameter (d1) extending from the exterior surface to a seam where the fluid-cooled and protective non-fluid cooled portions meet supporting at least one fluid-cooled SC burner having a fluid-cooled burner tip (4) attached to a burner body (6), at least the fluid-cooled burner tip protrudes away from the seam, the protective non-fluid-cooled portion having corresponding at least one combustion products flow passage of diameter (d2) ≤ (d1);
 (c) the at least one fluid-cooled SC burner comprising (or consisting essentially of, or consisting of)
  (i) the burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second, and a longitudinal bore having a longitudinal axis, and a second internal conduit (14) substantially concentric with, and positioned internal of the first internal conduit, the second internal conduit (14) comprising a first end, a second end, and a longitudinal bore having a longitudinal axis, the external conduit (10) and first internal conduit (12) forming a first annulus (11) there between for passing a cooling fluid, the first internal conduit (12) and the second internal conduit (14) forming a second annulus (13) there between for passing the cooling fluid, and a third internal conduit (15) configured to form a third annulus between the second (14) and third (15) internal conduits, the burner body comprising fuel and oxidant inlet ports near the second ends of the conduits; and
  (ii) the burner tip (4) defined by an inner wall (28) and an outer wall (30) connected via a half-toroid crown (32), the outer wall (30) removably fixed to the first end of the external conduit (10) via an outer connection, and the inner wall (28) removably fixed to the first end of the second internal conduit (14) via an inner connection, the burner tip (4) comprising a generally central burner tip flow passage configured to pass a combustible mixture therethrough, the generally central burner tip flow passage defined by the inner wall (28).

FIG. 7A

SUBMERGED COMBUSTION MELTERS, WALL STRUCTURES OR PANELS OF SAME, AND METHODS OF USING SAME

BACKGROUND INFORMATION

Technical Field

The present disclosure relates generally to the field of submerged combustion melters, submerged combustion burners and burner panels, and methods of use, particularly for melting glass-forming materials, mineral wool forming materials, rock wool forming materials and other non-metallic inorganic materials.

Background Art

A submerged combustion melter (SCM) may be employed to melt glass batch and/or waste glass materials to produce molten glass, or may melt minerals or rock feedstock to make mineral or rock wool, by passing oxygen, oxygen-enriched mixtures, or air along with a liquid, gaseous and/or particulate fuel (some of which may be in one or more of the feedstock materials), directly into a molten pool of glass or other material, usually through burners submerged in a turbulent melt pool. The introduction of high flow rates of products of combustion of the oxidant and fuel into the molten material, and the expansion of the gases during submerged combustion (SC), cause rapid melting of the feedstock or portions thereof and much turbulence and foaming.

In the context of SCMs, SC burners are predominately water-cooled, nozzle mix designs and may avoid premixing of oxidant and fuel for safety reasons due to the increased reactivity of using oxygen or oxygen-enriched oxidants as the oxidant versus air. Nevertheless, certain submerged combustion burners employ a smooth exterior surface, half-toroid metallic burner tip of the same or similar material as the remainder of the burner, where the fuel and oxidant begin mixing just after escaping the burner tip. When using such burners in an SCM for the manufacture of glass or other molten materials, the burner tip is placed in an extreme environment. The burner tip may be exposed to corrosive oxidants, fuels, and/or combustion products, high temperature direct contact with molten and/or unmelted materials, internal pressure from water or other coolant, vaporization of coolant within the burner tip, thermal cycling, and the like. As a result, it has been determined that thermal fatigue resistance, high melting point, high temperature corrosion/oxidation resistance, high temperature structural strength, and ability to join/fabricate are some of the key requirements for designing next generation SC burners.

Due to these requirements, noble metal (sometimes referred to as precious metal) alloys have become the focus. However, being expensive alloys, it is not presently economical to fabricate the entire burner using these materials, and it would be advantageous to eliminate use of noble metals altogether. Because of this, up until now the burner designer was left with the challenge of determining how to best attach the non-noble metal portion of the burner to the metal tip (noble metal or non-noble metal) without sacrificing other concerns, such as good mechanical strength, coolant leak proofing, and noble metal recovery, if used. It would be an advance in the submerged combustion melter art to avoid some or all of these issues, and prolong the run-length or campaign length of submerged combustion melters.

SUMMARY

In accordance with the present disclosure, submerged combustion melters (SCM) are described having a floor, a roof or ceiling, and a wall connecting the floor and roof, the floor or wall (or section of either of these) having at least one SC burner, an SC burner cover material, and a cooled base (in certain embodiments, a water-cooled based). In instances where molten foamy glass is produced by the SCM, the SC burner cover material may be a hard brick or moldable refractory, or glass batch or cullet based material, or mixture or layered combination thereof, that covers and protects the at least one SC burner from the molten glass. If another feedstock is being melted, such as basalt rock or mineral feedstock, the SC burner cover material may comprise a hard brick or moldable refractory, or crushed rock or mineral based material (or recycled versions thereof), or mixture or layered combination thereof. The SC burner cover material is applied so that tips of the SC burners are protected from the molten material (molten foamy glass, molten foamy rock, molten foamy mineral) while leaving at least one opening for combustion products to flow freely into the molten or semi-molten material from each SC burner. It will be recognized that "molten" material may include portions that are still solid or not yet dissolved into the molten material. Some advantages of this technique may include reduced thermal fatigue due to thermal cycling on the burner tips, and reduced flame impingement on the SC burner tips, especially during startup from flames from roof-mounted burners, but also from neighboring SC burners. Without the presence of the SC burner cover material, accretions may form on SC burner tips during operation of the SCM causing deflection of flames therefrom, and in extreme cases onto neighboring SC burners or the melter refractory.

One aspect of this disclosure is a submerged combustion burner panel comprising (or consisting essentially of, or consisting of):

(a) a panel body comprising a fluid-cooled portion and a protective non-fluid cooled portion, an exterior surface defined by the fluid-cooled portion, and an interior surface defined by the protective non-fluid cooled portion, wherein exterior and interior refer to an SCM in which the panel is installed;

(b) the fluid-cooled portion having at least one burner support passage of diameter (d1) extending from the exterior surface to a seam where the fluid-cooled and protective non-fluid cooled portions meet supporting at least one fluid-cooled SC burner having a fluid-cooled burner tip attached to a burner body, at least the fluid-cooled burner tip protrudes away from the seam, the protective non-fluid-cooled portion having corresponding at least one combustion products flow passage of diameter (d2)≤(d1);

(c) the at least one fluid-cooled SC burner comprising (or consisting essentially of, or consisting of)

(i) the burner body, in certain embodiments devoid of 90 degree or less angles, comprising an external conduit and a first internal conduit substantially concentric therewith, and positioned internal of the external conduit, the external conduit comprising a first end, a second end, and a longitudinal bore having a longitudinal axis, the first internal conduit comprising a first end, a second end, and a longitudinal bore having a longitudinal axis, and a second internal conduit substantially concentric with, and positioned internal of the first internal conduit, the second internal conduit comprising a first end, a second end, and a longitudinal bore having a longitudinal axis, the external conduit and first internal conduit forming a first annulus there between for passing a cooling fluid, the first internal conduit and the second internal conduit forming a second annulus there between for passing the cooling fluid, and a third internal conduit configured to form a third annulus between the second and third internal conduits, the burner body comprising fuel and oxidant inlet ports near the second ends of the conduits; and (ii) the burner tip defined by an inner wall and an outer wall connected via a half-toroid crown, the outer wall removably fixed to the first end of the external conduit via an outer connection, and the inner wall removably fixed to the first end of the second internal conduit via an inner connection, the burner tip comprising a generally central burner tip flow passage configured to pass a combustible mixture therethrough, the generally central burner tip flow passage defined by the inner wall.

Other burner panel embodiments, such as those including fluid-cooled protective members, and submerged combustion melters (SCM) comprising at least one burner panel of this disclosure, and methods of producing molten non-metallic inorganic materials such as molten glass, in the SCMs, are considered aspects of this disclosure. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Submerged combustion burner panels, submerged combustion melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 7A and 7B is a schematic logic diagram of a method of melting non-metallic inorganic materials in accordance with the present disclosure.

Figure 1:
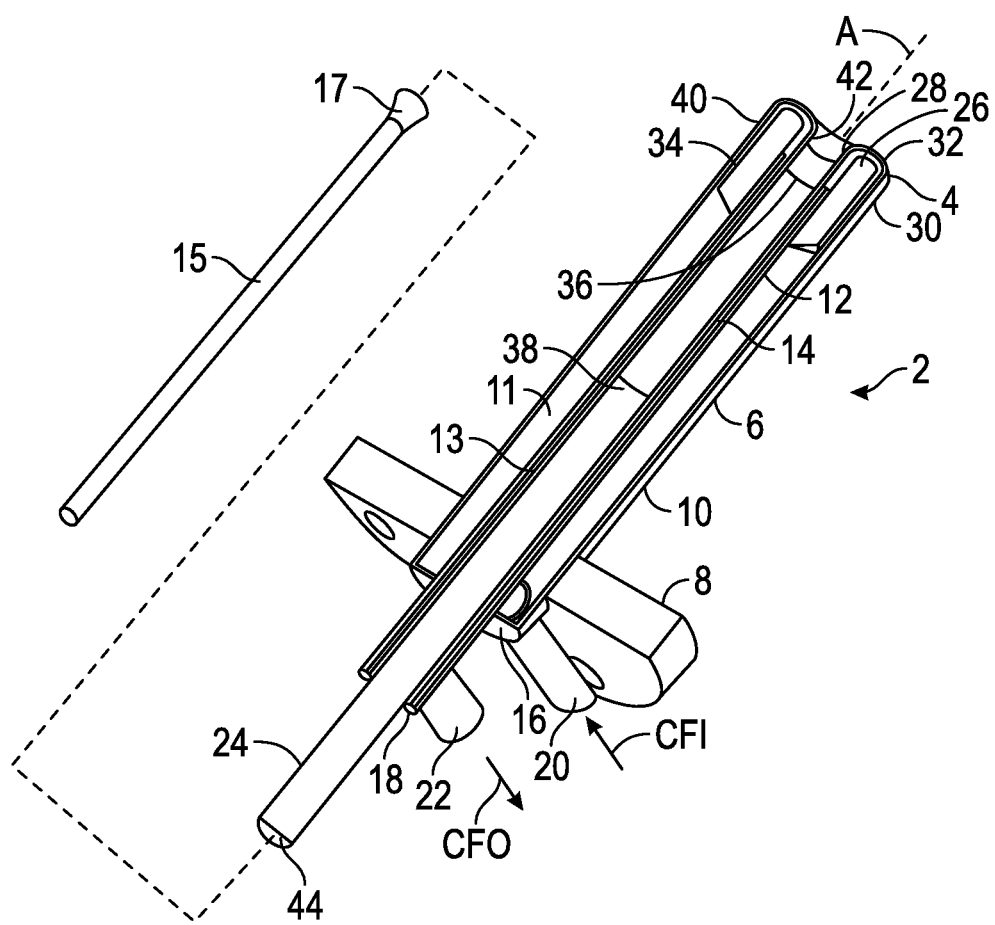
FIG. 1 is a schematic partially exploded perspective view of a prior art fluid-cooled SC burner useful in the SC burner panels, SCMs, and SC methods of the present disclosure.

It is to be noted, however, that the appended drawings are schematic in nature, may not be to scale, and that FIGS. 2-6, 7A and 7B illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed burner panels, SCMs, and methods. However, it will be understood by those skilled in the art that the apparatus and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are also explicitly disclosed herein and are part of this disclosure. An example of "consisting essentially of" may be with respect to the composition of a burner conduit: a conduit consisting essentially of carbon steel means there may be a minor portions or trace amounts of metals, oxides, and other chemical species that are noble metals, such chromium, platinum, and the like, and a conduit consisting essentially of noble metal may have trace amounts of iron, iron oxides, carbon, and other metal oxides. An example of "consisting of" may be a burner made up of components that are one or more carbon steels and no noble metals or ceramic materials, or conduits made up of only noble metals. Another example of "consisting essentially of" may be with respect to particulate feedstock that consists essentially of inorganic feedstock, meaning that a minor portion, perhaps up to 10, or up to 5, or up to 4, or up to 3, or up to 2, or up to 1 wt. percent may be organic. An example of methods and systems using the transition phrase "consisting of" includes those where only burners having liquid-cooled jackets are used, with no gas-cooled jackets, or vice versa. The term "comprising" and derivatives thereof is not intended to exclude the presence of any additional component, step or procedure, whether or not the same is disclosed herein. In order to avoid any doubt, all compositions, apparatus, systems, and methods claimed herein through use of the term "comprising" may include any additional component, step, or procedure unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight and all test methods are current as of the filing date hereof. The acronym "ASTM" means ASTM International, 100 Barr Harbor Drive, PO Box C700, West Conshohocken, Pa., 19428-2959 USA. As used herein, "NACE" refers to the corrosion prevention organization formerly known as the National Association of Corrosion Engineers, now operating under the name NACE International, 15835 Park Ten Pl, Houston, Tex. 77084.

All numbers, including degree angles, disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: R=RL+ k*(RU−RL), wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

All U.S. patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present SC burners employing a metallic burner tip of the same or similar material as the remainder of the burner is that, when using such burners in an SCM for the manufacture of glass or other inorganic materials, the burner tip is placed in an extreme environment. One problem is that the tip of the burner is exposed to the extreme high temperatures of an oxy-gas flame when oxygen-enriched oxidants are used. Such flames, when deflected, can melt the burner tip. Using noble metals and alloys for burner tips presents the additional challenge of attaching the burner tip to the base metal of the remainder of the burner. The present application is devoted to resolving this challenge with a new approach to burner panel design for submerged combustion.

One technique of avoiding cracked or damaged crowns of fluid-cooled half-toroid burner tips has been to increase surface area and fatigue resistance of the crown by providing at least one physical convolution sufficient to increase surface area and fatigue resistance of the crown compared to a half-toroid crown of the same composition lacking the at least one physical convolution, such as disclosed in Applicant's co-pending U.S. patent application Ser. No. 14/785,327, filed Oct. 17, 2015, or a concave burner tip crown such as described in Applicant's U.S. Pat. No. 9,777,922, issued Oct. 3, 2017. The submerged combustion burner panels of the present disclosure have the added advantage that complicated burner tip crowns such as these may be unnecessary, although they may be employed in the submerged combustion panels of the present disclosure if already present, or where it is desired to minimize the amount of protective cover material.

Various terms are used throughout this disclosure. "Submerged" as used herein means that combustion gases emanate from combustion burners whose tips are submerged under the level of the molten glass or other molten material. The SC burners themselves installed in fluid-cooled combustion burner panels; the burner panels may form all or a section of the SCM floor, sidewall, roof, or in melter embodiments comprising more than one submerged combustion burner, any combination thereof (for example, two floor burner panels and one sidewall burner panel, or one burner panel forming the entire floor, and one roof burner panel). A "burner panel" is simply a panel equipped to emit fuel and oxidant, or in some embodiments only one of these (for example a portion of a burner panel may only emit fuel, while another burner panel portion emits only oxidant, and vice versa). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Burner panels of the present disclosure aim to solve the problem of short life of SC burners. In certain embodiments this may be accomplished by use of burner panels including fluid-cooled or non-fluid-cooled portions, where the non-fluid-cooled portion employs a protective material barrier on an external surface of the external-most burner conduit and burner tips of the SC burners, thus reducing the exposure of the external-most burner conduit and burner tip to extreme high temperatures as well as reducing the severity of extreme thermal cycling experienced by unprotected SC burner tips.

In certain embodiments, the burner panel may comprise (or consist of, or consist essentially of):
(a) a panel body comprising a fluid-cooled portion and a protective non-fluid cooled portion, an exterior surface defined by the fluid-cooled portion, and an interior surface defined by the protective non-fluid cooled portion, wherein exterior and interior refer to an SCM in which the panel is installed;
(b) the fluid-cooled portion having at least one burner support passage of diameter (d1) extending from the exterior surface to a seam where the fluid-cooled and protective non-fluid cooled portions meet supporting at least one fluid-cooled SC burner having a fluid-cooled burner tip attached to a burner body, at least the fluid-cooled burner tip protrudes away from the seam, the protective non-fluid-cooled portion having corresponding at least one combustion products flow passage of diameter $(d2) \leq (d1)$;

(c) the at least one fluid-cooled SC burner comprising (or consisting essentially of, or consisting of)

(i) the burner body comprising an external conduit and a first internal conduit substantially concentric therewith, and positioned internal of the external conduit, the external conduit comprising a first end, a second end, and a longitudinal bore having a longitudinal axis, the first internal conduit comprising a first end, a second end, and a longitudinal bore having a longitudinal axis, and a second internal conduit substantially concentric with, and positioned internal of the first internal conduit, the second internal conduit comprising a first end, a second end, and a longitudinal bore having a longitudinal axis, the external conduit and first internal conduit forming a first annulus there between for passing a cooling fluid, the first internal conduit and the second internal conduit forming a second annulus there between for passing the cooling fluid, and a third internal conduit configured to form a third annulus between the second and third internal conduits, the burner body comprising fuel and oxidant inlet ports near the second ends of the conduits; and (ii) the burner tip defined by an inner wall and an outer wall connected via a half-toroid crown, the outer wall removably fixed to the first end of the external conduit via an outer connection, and the inner wall removably fixed to the first end of the second internal conduit via an inner connection, the burner tip comprising a generally central burner tip flow passage configured to pass a combustible mixture therethrough, the generally central burner tip flow passage defined by the inner wall.

Certain burner panel embodiments may comprise wherein the protective non-fluid cooled portion comprises a protective cover material applied to a major surface of the fluid-cooled panel opposite the exterior surface so that at least a circumferential and radial portion of the burner body and the outer wall and crown of the fluid-cooled burner tip are protected from molten material (for example, but not limited to molten foamy glass, molten foamy rock, molten foamy mineral), the cover material defining the at least one combustion products flow passage of diameter defined by a cover material inner wall.

Certain burner panel embodiments may comprise wherein the protective cover material is applied to, stacked on, coated on, troweled on, or poured onto the major surface of the fluid-cooled panel opposite the exterior surface so that tips of the SC burners are protected from the molten material (molten foamy glass, molten foamy rock, molten foamy mineral) while leaving the corresponding at least one combustion products flow passage of diameter $(d2) \leq (d1)$. Certain burner panel embodiments may comprise wherein the protective cover material comprises hard brick stacked onto the major surface of the fluid-cooled panel opposite the exterior surface. Certain burner panel embodiments may comprise wherein the protective cover material comprises a moldable refractory coated on, troweled on, or poured onto the major surface of the fluid-cooled panel opposite the exterior surface. Certain burner panel embodiments may comprise wherein the protective cover material comprises glass batch or cullet based material, or mixture or layered combination thereof, combined with a moldable refractory coated on, troweled on, or poured onto the major surface of the fluid-cooled panel opposite the exterior surface. Certain burner panel embodiments may comprise wherein the protective cover material comprises basalt rock or mineral feedstock, or mixture or layered combination thereof, combined with a moldable refractory coated on, troweled on, or poured onto the major surface of the fluid-cooled panel opposite the exterior surface.

Certain burner panel embodiments may comprise wherein the fluid-cooled portion of the panel body is a continuous flow submerged combustion melter cooling wall panel.

Certain burner panel embodiments may comprise the burner tip crown and inner and outer walls comprising same or different corrosion resistant and fatigue resistant material, at least one of the corrosion and fatigue resistance being greater than material comprising the external conduit under conditions experienced during submerged combustion melting of glass-forming, rock-forming, or mineral-forming materials. Certain burner panel embodiments may comprise wherein each fluid-cooled burner tip consists of one or more noble metals.

Certain burner panel embodiments may comprise wherein a top surface of the fluid-cooled burner crown is at a distance $(d3)$ from the seam.

Certain burner panel embodiments may comprise wherein the corresponding at least one combustion products flow passage of diameter $(d2) \leq (d1)$ has an inner surface angled away from a longitudinal axis through the fluid-cooled burner at an angle ranging from 0 degrees to about 45 degrees. Certain burner panel embodiments may comprise wherein a distal end of the one or more fuel conduits extends away from the seam a distance $(d4) < (d3)$, and the interior surface defined by the protective non-fluid cooled portion extends above the burner tip crown a distance $(d5)$, where a ratio of $(d5):(d3)$ ranges from about 0.5 to about 2. Certain burner panel embodiments may comprise wherein the at least one combustion products flow passage defines a conical passage having a cone angle ($\alpha$) to a burner longitudinal axis (A) ranging from 0 to about 45 degrees. Certain burner panel embodiments may comprise wherein the at least one combustion products flow passage defines a cylindrical passage of constant diameter, and $(d2) < (d1)$.

Certain burner panel embodiments may comprise those wherein the lower fluid-cooled portion and the upper non-fluid cooled portion are positioned in layers, with the lower fluid-cooled portion supporting one or more fluid-cooled SC burners therein and the layer or layers of protective non-fluid-cooled material.

In certain embodiments, the burner panel may comprise (or consist of, or consist essentially of):

(a) a panel body devoid of 90 degree or less angles comprising a fluid-cooled portion and a protective non-fluid cooled portion, an exterior surface of the panel body defined by the fluid-cooled portion, and an interior surface defined by the protective non-fluid cooled portion;

(b) the fluid-cooled portion having at least one burner support passage of diameter $(d1)$ extending from the exterior surface to a seam where the fluid-cooled and protective non-fluid cooled portions meet supporting at least one fluid-cooled SC burner having a fluid-cooled burner tip attached to a burner body, at least the fluid-cooled burner tip protrudes away from the seam, the protective non-fluid-cooled portion having corresponding at least one combustion products flow passage of diameter (d2)≤(d1);

(c) the at least one fluid-cooled SC burner comprising (or consisting essentially of, or consisting of)

(i) the burner body comprising an external conduit and a first internal conduit substantially concentric therewith, and positioned internal of the external conduit, the external conduit comprising a first end, a second end, and a longitudinal bore having a longitudinal axis, the first internal conduit comprising a first end, a second end, and a longitudinal bore having a longitudinal axis, and a second internal conduit substantially concentric with, and positioned internal of the first internal conduit, the second internal conduit comprising a first end, a second end, and a longitudinal bore having a longitudinal axis, the external conduit and first internal conduit forming a first annulus there between for passing a cooling fluid, the first internal conduit and the second internal conduit forming a second annulus there between for passing the cooling fluid, and a third internal conduit configured to form a third annulus between the second and third internal conduits, the burner body comprising fuel and oxidant inlet ports near the second ends of the conduits; and (ii) the burner tip defined by an inner wall and an outer wall connected via a crown, the outer wall removably fixed to the first end of the external conduit via an outer connection, and the inner wall removably fixed to the first end of the second internal conduit via an inner connection, the burner tip comprising a generally central burner tip flow passage configured to pass a combustible mixture therethrough, the generally central burner tip flow passage defined by the inner wall.

In certain embodiments, the burner panel may include only SC burners consisting of one central fuel conduit, one concentric oxidant conduit of larger diameter than the central fuel conduit forming an annulus therebetween, the oxidant conduit forming an inner wall of a fluid-cooled exterior annulus, and a burner exterior conduit. Certain embodiments may include a burner insert in the fluid-cooled annulus. These embodiments may be paired with other panels supplying fuel or oxidant (as the case might be), the pair resulting in combustion of the fuel from one panel with the oxidant from the other panel.

In certain embodiments the burner panel may comprise a pre-disposed layer or layers of glass, ceramic, refractory, and/or refractory metal or other protective material as a protective skull over the non-fluid cooled body portion or layer. The layer or layers of protective material may or may not be the same as the material to be melted in the SCM.

In certain embodiments, the burner panel may include a pre-disposed layer or layers of glass, ceramic, refractory, and/or refractory metal or other protective material on surfaces of the through passage through the non-fluid-cooled portions of the burner panel body. The layer or layers of protective material may or may not be the same as the material to be melted in the SCM.

In certain burner panel embodiments, the protective non-fluid cooled portion may be installed and/or removed from the burner panel separately. In certain embodiments, the protective material of a burner panel may be removed from a position inside of an SCM, while the SC burners of the same burner panel may be removed from the burner panel from outside of an SCM.

FIG. 1 illustrates schematically a prior art SC burner having a longitudinal axis (A) and a fluid-cooled portion 2 composed of a burner tip 4 attached to a burner body 6. A burner main flange 8 connects the burner to a burner panel, not illustrated in FIG. 1. Burner body 6 is comprised of an external conduit 10, a first internal conduit 12, a second internal conduit 14, and end plates 16, 18. A coolant fluid inlet conduit 20 is provided, along with a coolant fluid exit conduit 22, allowing ingress of a cool coolant fluid as indicated by the arrow denoted "CFI", and warmed coolant fluid egress, as indicated by an arrow denoted "CFO", respectively. A first annulus 11 is thus formed between substantially concentric external conduit 10 and first internal conduit 12, and a second annulus 13 is formed between substantially concentric first and second internal conduits 12,14. A proximal end 24 of second internal conduit 14 may be sized to allow insertion of a fuel or oxidant conduit 15 (depending on the burner arrangement), which may or may not include a distal end nozzle 17. When conduit 15 and optional nozzle 17 are inserted internal of second internal conduit 14, a third annulus is formed there between. In certain embodiments, oxidant flows through the third annulus, while one or more fuels flow through conduit 15, entering through a port 44. In certain other embodiments, one or more fuels flow through the third annulus, while oxidant flows through conduit 15, entering through port 44.

Still referring to FIG. 1, fluid-cooled portion 2 of the burner includes a ceramic or other material insert 26 fitted to the distal end of first internal conduit 12. Insert 26 has a shape similar to but smaller than burner tip 4, allowing coolant fluid to pass between burner tip 4 and insert 26, thus cooling burner tip 4. Burner tip 4 includes an inner wall 28, an outer wall 30, and a crown 32 connecting inner wall 28 and outer wall 30. In prior art burners, welds at locations 34 and 36, and optionally at 38, 40 and 42, connect burner tip 4 to external conduit 10 and second internal conduit 14, using conventional weld materials to weld together burner body metal parts, such as carbon steel, stainless steel, or even titanium, to similar or more exotic noble metal burner tips. Despite the use of coolant and even titanium (which ordinarily is considered quite corrosion-resistant) for burner body 6 and burner tip 4, the operating life of burners as illustrated and described in relation to FIG. 1 are very limited in the SCM environment, even when titanium or noble metal burner tips are employed, where temperatures of molten glass may reach 1300° C., and the turbulence of the molten glass caused by the burners themselves as well as combustion gases contribute to form a highly erosive environment in contact with burner tip 4 and any exposed portions of the burner body.

Figure 2:
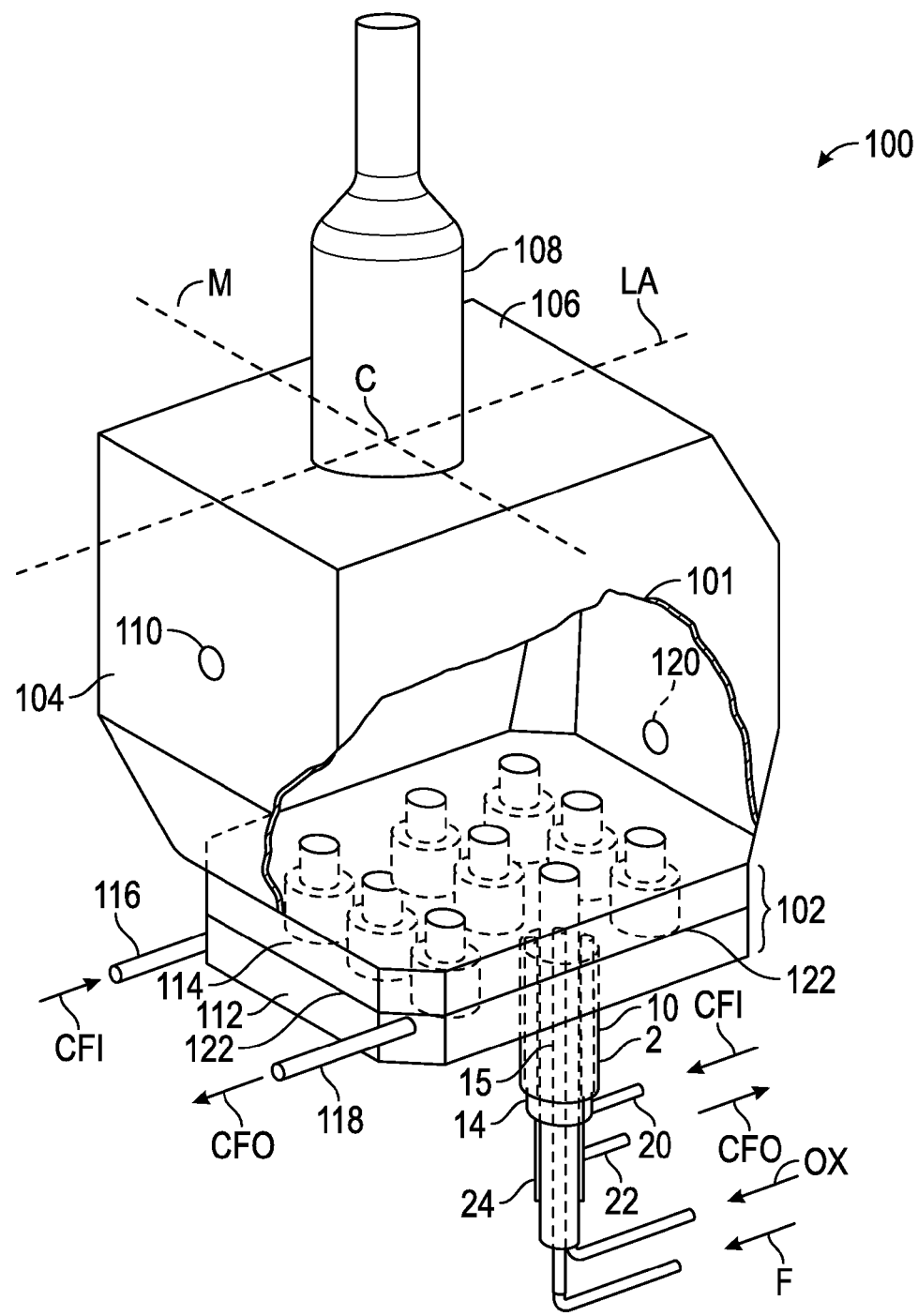
FIG. 2 is a schematic perspective view, with portions cut away, of one SCM embodiment in accordance with the present disclosure illustrating the burner of FIG. 1 installed in a floor burner panel in accordance with the present disclosure.
Figure 5:
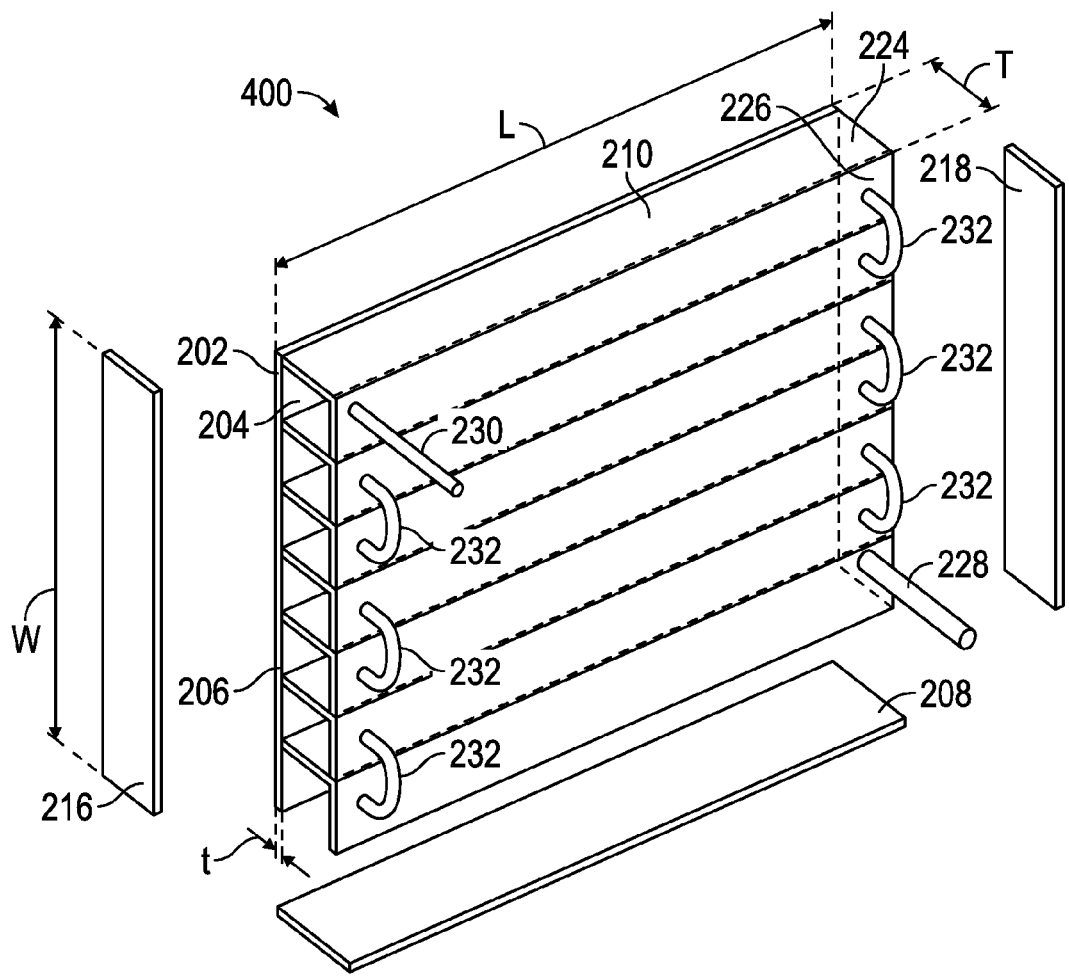
FIGS. 5 and 6A are schematic perspective views of two fluid-cooled burner panel portions useful in burner panels of the present disclosure.
Figure 6A:
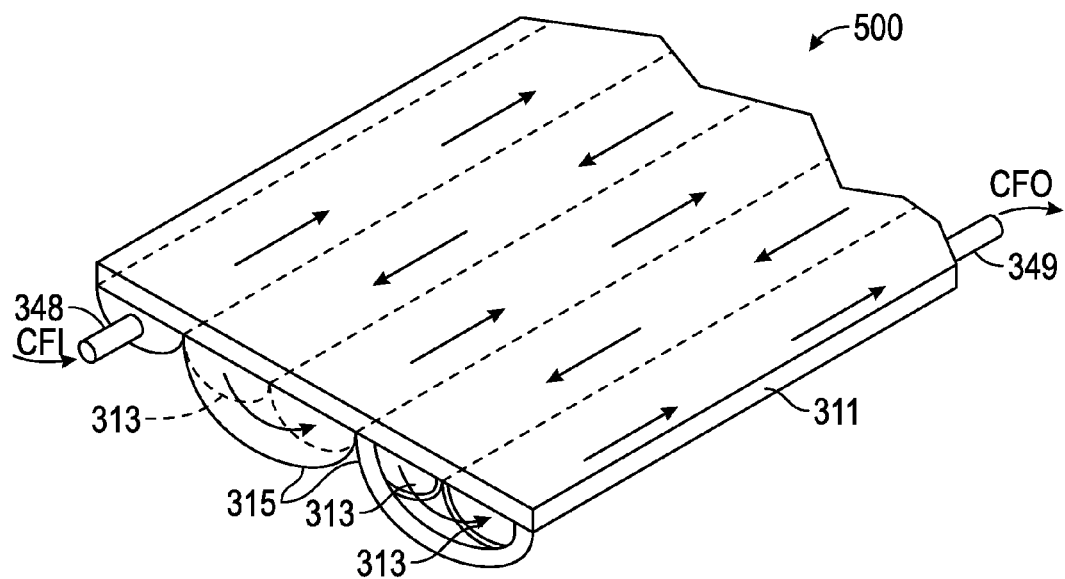
Figure 6B:
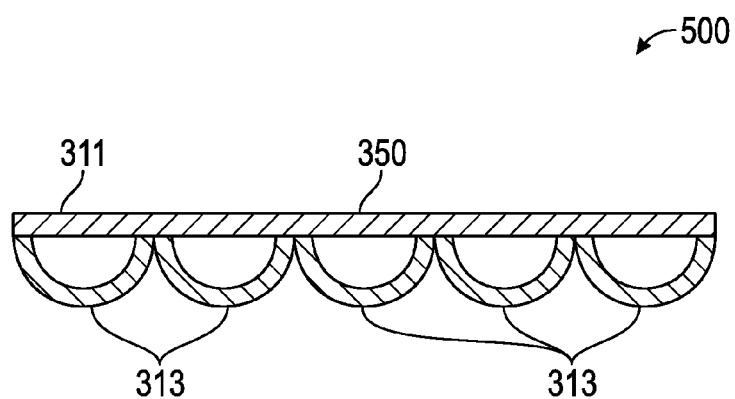
FIG. 6B is a schematic cross-sectional view of the fluid-cooled burner portion of FIG. 6A.

FIG. 2 is a schematic perspective view of one SCM embodiment 100 in accordance with the present disclosure with a portion 101 cut away, illustrating the SC burner of FIG. 1 installed in a floor burner panel in accordance with the present disclosure, with eight other SC burners illustrated in phantom. SCM embodiment 100 has a longitudinal axis (LA), a midpoint (M), and a center point (C). Embodiment 100 includes a panel body 102 as a floor of the SCM, the SCM also having a sidewall 104, an SCM roof or ceiling 106, and stack 108. A feedstock inlet 110 is illustrated in a feed end portion of sidewall 104, and a molten product outlet 120 in an exit end portion of the sidewall 104. Panel 102 includes a fluid-cooled portion 112 and a non-fluid-cooled portion or layer, or layers 114 co-extensive with fluid-cooled portion 112, and a seam 122 between fluid-cooled portion 112 and non-fluid-cooled portion 114. Cooling fluid inlet conduit 116 and cooling fluid outlet conduit 118 are illustrated, embodiment 100 illustrating but one possible arrangement of burners, coolant conduits, and fuel and oxidant conduits. Structures of fluid-cooled portion 112 useful in the present disclosure include those described in conjunction with schematic FIGS. 5, 6A and 6B herein. FIG. 5 illustrates one embodiment of a continuous flow submerged combustion melter cooling wall panel described in Applicant's co-pending U.S. patent application Ser. No. 15/247,515, filed Aug. 25, 2016. Other embodiments of continuous flow submerged combustion melter cooling wall panels described in that application, or improvements thereon, may also be used. FIGS. 6A and 6B illustrate another embodiment of fluid-cooled portion.

Figure 3:
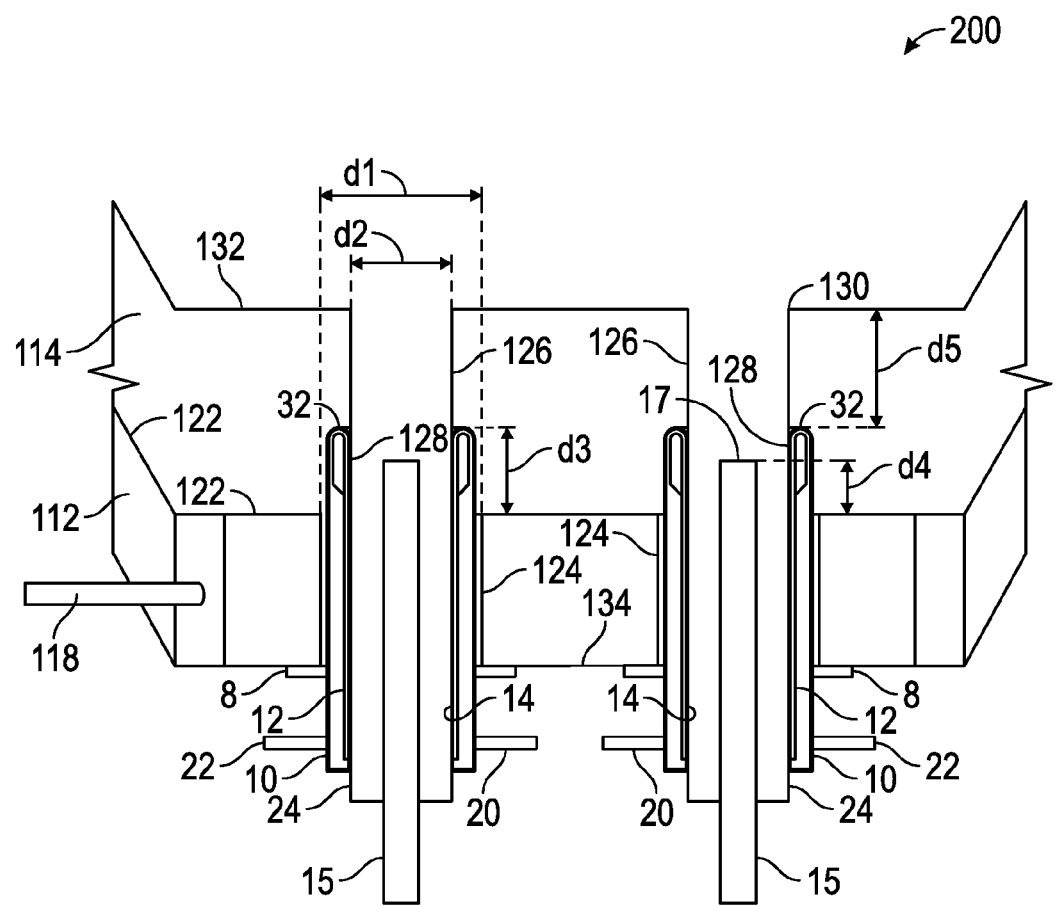
FIGS. 3, 4A, and 4B are schematic cross-sectional views of three submerged combustion burner panel embodiments in accordance with the present disclosure.
Figure 4A:
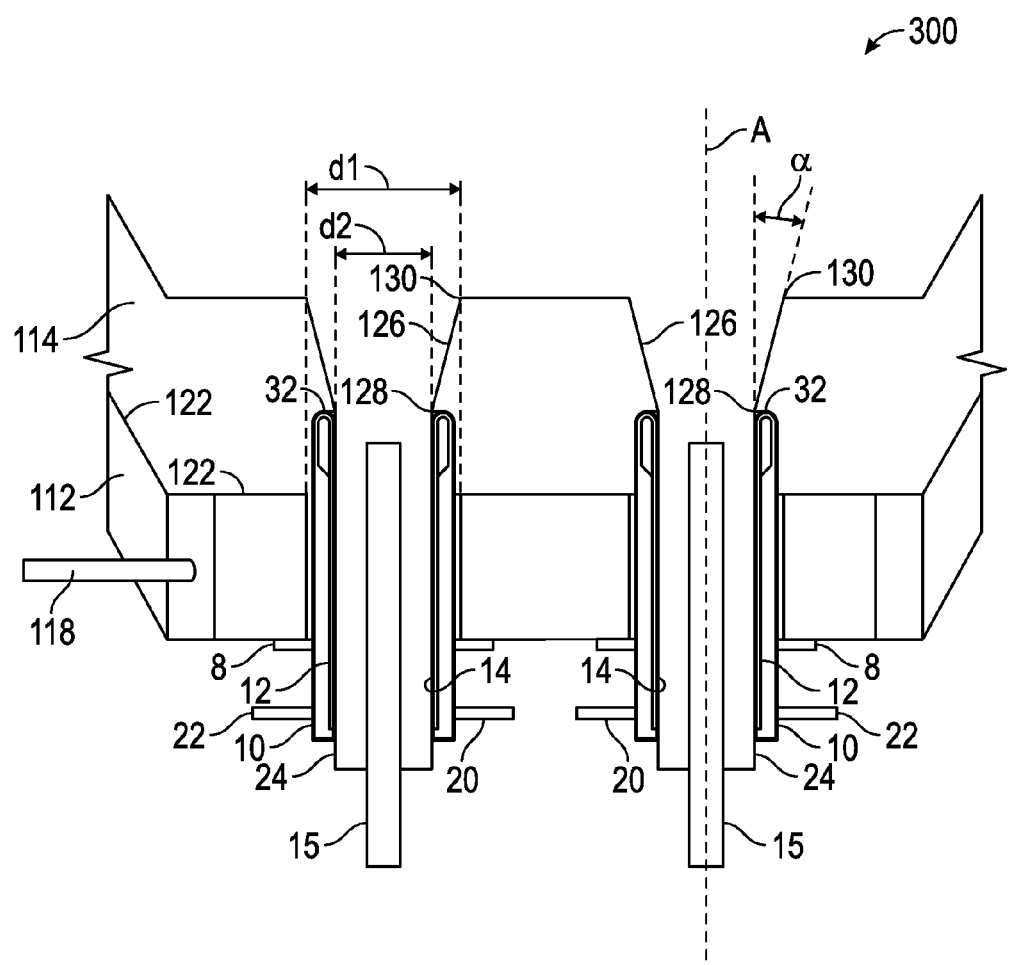
Figure 4B:
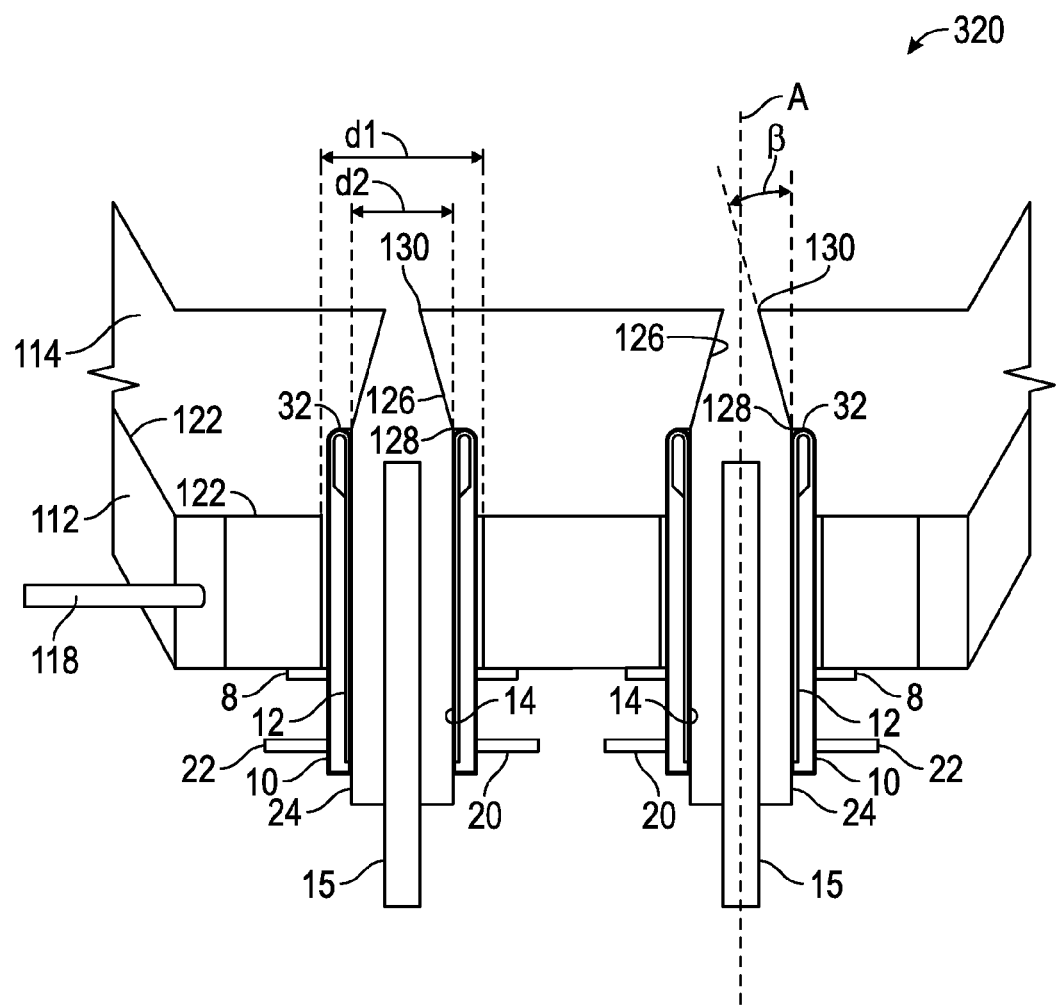

FIGS. 3, 4A, and 4B are schematic cross-sectional views of three submerged combustion burner panel embodiments 200, 300, and 320 in accordance with the present disclosure, and illustrating certain additional features of such panels. Embodiment 200 illustrated schematically in FIG. 3 illustrates two burner support passages 124 of diameter (d1) through fluid-cooled portion 112, and two combustion products flow passages 126 of constant diameter (d2) through non-fluid-cooled portion 114, where (d2)<(d1), as well as a burner panel interior surface 132 and burner panel exterior surface 134. Combustion products flow passages 126 include an inlet 128 and an outlet 130. Burner tip crowns 32 extends away from seam 122 a distance (d3); fuel or oxidant conduit 15 nozzle 17 extends a distance (d4) away from seam 122; and non-fluid cooled portion 114 extends a distance (d5) away from burner tip crown 32. Non-fluid cooled portion completely engulfs that portion of the SC burners defined by (d3) and SC burner tip crowns 32, but does not extend to SC burner tip inner wall 28. The distances (d1), (d2), (d3), (d4), and (d5) may have ranges such presented in Table 1, it being understood that these are merely examples, and other dimensions may be employed outside of these ranges. It will be understood that these are approximate ranges (each number includes the word "about" before it), are not exclusive ranges, and that any range within the tabulated ranges are explicitly disclosed herein. It will be apparent from FIGS. 3, 4A, and 4B that the sum of (d3) and (d5) equals the total thickness of non-fluid-cooled portion 114.

While FIGS. 3, 4A, and 4B illustrate a gap between passages 124 and burner external conduit 10, this is only to illustrate the presence of the passages 124. In certain embodiments there would be little or no gap, depending on the construction details of fluid-cooled portion 112. For example, if fluid-cooled portion 112 is constructed as per embodiment 400 illustrated schematically in FIG. 5, exterior burner conduits 10 may be welded to holes cut or formed into top and bottom metal plates making up fluid-cooled portion 112; alternatively, the SC burners may simply be bolted to the bottom plate of fluid-cooled portion 112 using burner flanges 8.

Embodiment 300, illustrated schematically in FIG. 4A, is similar to embodiment 200, except that diameter (d2) of passages 126 has an initial value at inlet 128, and increases linearly to a higher value at outlet 130. The value of (d2) at outlet 130 may or may not exceed the value of (d1), and may be the same as (d1), as depicted schematically in FIG. 4A. This results in passages 126 forming an angle ($\alpha$) with respect to SC burner longitudinal axis (A). The value of ($\alpha$) may be the same or different from burner to burner in a single panel or SCM. Embodiment 320, illustrated schematically in FIG. 4B, is similar to embodiment 200, except that diameter (d2) of passages 126 has an initial value at inlet 128, and decreases linearly to a lower value at outlet 130.

The value of (d2) at outlet 130 may or may not exceed the value of the diameter of conduit 15, and may be the same as the diameter of conduit 15, as depicted schematically in FIG. 4B. This results in passages 126 forming an angle ($\beta$) with respect to SC burner longitudinal axis (A). The value of ($\beta$) may be the same or different from burner to burner in a single panel or SCM. Values of ($\alpha$) and ($\beta$) are also provided in Table 1. Other shapes of passages 126 may be contemplated, for example, employing uniform or non-uniform arcuate shaped (convex and concave) versions where angles ($\alpha$) and ($\beta$) are formed by chords having terminal points at 128 and 130. Other embodiments that are modified version of embodiments 200, 300, and 320 where passages 126 may be arcuate to begin and change to linear (or vice versa) may also be envisioned. Embodiment 320 (and arcuate concave versions thereof) has the advantage of using the protective non-fluid cooled portion 114 to concentrate the flame from the SC burner for better penetration of flame or combustion products emanating therefrom into the molten or semi-molten mass in the SCM. From experience, refractory materials used for the protective non-fluid cooled portion 114 have a limited life (1-10 days) in current designs due to erosion by melt, and that significant wear to the protective section occurs when cold batch or other feedstock covers the burner and deflects the flame to impinge on the protective non-fluid cooled portion 114. "Batch cover" or cover with other feedstock typically only happens during the initial filling process within the first 12 hours of operation. Angle ($\beta$) may help concentrate the flame during the batch cover to better penetrate the batch and reduce the possibility of deflected flame wear of protective non-fluid-cooled layer 114.

TABLE 1

Burner Dimensions

| Dimension | Range (in.) | Pref. Range. (in.) | Range (cm) | Pref. range (cm) |
|---|---|---|---|---|
| d1 | 3-12 | 5-10 | 8-30 | 13-25 |
| d2 | 1-8 | 2-5 | 3-20 | 5-51 |
| d3 | 0.5-6.0 | 0.5-4.0 | 1.3-15 | 1.3-10 |
| d4 | 0.25-5.5 | 1.0-3.5 | 0.6-14 | 2.5-9 |
| d5 | 1.0-7.0 | 2.0-5.0 | 2.5-18 | 5-13 |
| $\alpha$ (degrees) | 0-45 | 25-35 | N/A | N/A |
| $\beta$ (degrees) | 0-45 | 25-35 | N/A | N/A |

FIG. 5 is a schematic exploded perspective view illustrating one embodiment 400 of a continuous flow submerged combustion melter cooling wall panel useful in the burner panels of the present disclosure (preferably liquid-cooled, preferably water-cooled). Embodiment 400 illustrating schematically in FIG. 5 features a primary metal plate 202 having a length (L), width (W), and thickness (t), having a first major surface 204 and a second major surface (not illustrated) opposite surface 204, and a perimeter edge 206. A seal plate 208, a plurality of substantially 90 degree metal pieces 210, and first and second end plates 216, 218 are welded together to form the final structure having a length (L), width (W), and thickness (T), as explained more fully in Applicant's co-pending U.S. patent application Ser. No. 15/247,515, filed Aug. 25, 2016. In certain embodiments a single metal plate 202 may be molded or stamped into a shape including end plates 216, 218, and seal plate 208, then bent in one or multiple steps, thus eliminating the requirement of welding, brazing, or other heat-joining steps to join end plates 216, 218 and seal plate 208 to primary metal plate 202, as well as avoiding possible accelerated corrosion areas during operation of the SCM. A plurality welds between a plurality of first metal leg plates 224 and primary metal plate 202, while other welds form a plurality of junctions between distal ends of a plurality of second metal leg plates 226 and vertex of the next adjacent substantially 90 degree metal piece. Embodiment 400 is characterized primarily by all of the substantially 90 degree metal pieces having a length (L), and a plurality of U-bends 232 for fluidly connecting the coolant flow passages formed between each of the substantially 90 degree metal plates such that when coolant is introduced through inlet conduit 228 the coolant follows a serpentine path through the structure until exiting through outlet conduit 230. It will easily be recognized that the coolant flow direction could be reversed in certain embodiments. Conduits 228, 230, and U-bends 232 may be the same or different metal as primary metal plate 202 and end plates 216, 218, and may be welded, brazed, or soldered to metal leg plates 226, it being understood there are two through holes in each metal leg plate 226, one near each end thereof, for passage of coolant. One advantage of the structure of embodiment 400 is that burner panels of this disclosure constructed with such cooling panels may be butted against one another when constructing the SCM, since there is no hardware protruding from end plates 216, 218. Other suitable fluid-cooled portions as described in Applicant's co-pending U.S. patent application Ser. No. 15/247,515, filed Aug. 25, 2016, may be employed, such as those featuring a one piece milled metal (pref. carbon steel) plate including a plurality of substantially parallel, equal length coolant flow channels milled or formed therein. The various dimensions of the continuous flow submerged combustion melter cooling wall panels of the present disclosure may have values in accordance with Table 2, it being understood that these are merely examples, and other dimensions may be employed outside of these ranges. It will be understood that these are approximate ranges (each number includes the word "about" before it), are not exclusive ranges, and that any range within the tabulated ranges are explicitly disclosed herein.

TABLE 2

Dimensions of continuous flow submerged combustion melter cooling wall panels

| Feature | Range | Pref. range |
| --- | --- | --- |
| L | 0.25-10 m | 1.0-5 m |
| W | 0.1-5 m | 1.0-2 m |
| t | 0.1-20 cm | 1-5 cm |
| T | 5-40 cm | 10-30 cm |
| $D_H$, hydraulic diameter of flow channel | 1-10 cm | 2-5 cm |

FIGS. 6A and 6B illustrate another fluid-cooled panel embodiment 500 including a metal support plate 311 having a plurality of metal or other material conduits 313 for flow of coolant fluid there through. In embodiment 500 illustrated in FIGS. 6A and 6B, coolant fluid enters through conduit 348 then passes through one conduit 313 in one direction and returns in the next adjacent conduit 313 via elbows 315, and exits through conduit 349. In other embodiments, each conduit 313 may flow coolant fluid in the same direction, with the chilled coolant fluid supplied via a chilled fluid manifold, and warmed coolant fluid collected in a second manifold (not illustrated). Other arrangements are possible. Non-fluid-cooled portion would be applied or layered onto a surface 350 of fluid-cooled portion of embodiment 500.

Referring again to FIGS. 1-3, 4A, and 4B, the various burner conduits are substantially concentric. As used herein, "substantially concentric" means that conduits 10, 12, 14, and 15 may be concentric, or conduit 15 may be non-concentric with a longitudinal axis "A" of the burner (see FIG. 4), especially if conduit 15 is comprised of more than one conduit. If conduit 15 is more than one conduit (for example 2 to 10, or 2 to 8, or 2 to 6, or 3 to 6 conduits), the conduits 15 may be centered about the longitudinal axis A of the burner. In certain embodiments conduit(s) 15 define a primary passage for fuel ("F"), while the space between conduit 14 and inner conduit(s) 15 defines an annulus for oxidant ("OX"). For example, during operation fuel may flow through conduit 15 (and thus conduit 15 may be referred to as a "fuel conduit") while oxidant may flow through the annulus between conduits 14 and 15 (and thus conduit 14 may be referred to as an "oxidant conduit"). In other embodiments, conduit 14 may be the fuel conduit while conduit(s) 15 may be the oxidant conduit.

In each embodiment 100, 200, 300, and 320, the design is intended to protect the burner tip crowns 32, which is the position of highest temperature of the burners during SCM operation. The diameter (d2) may initially be constant, but over time during operation may broaden due to erosion. The rate of erosion may be controlled by selection of the material of non-fluid-cooled portion 112, or at least that portion forming through passages 126. For example, through passages 126 may be formed from a controllably erodible material that erodes at a faster or slow rate than the material of non-fluid-cooled portion 112. Such materials may include ceramics such as, but not limited to, alumina and silicon nitride, refractory materials such as, but not limited to, chrome-containing or zircon-based refractory metals, and noble metals, or mixtures or combinations thereof. A skull layer (not illustrated) of product being produced in the SCM may form on interior surface 132 and through passages 126 during operation of the SCM.

Submerged combustion melters within the present disclosure are not limited to that illustrated in FIG. 2. Referring again to FIG. 2, a portion of the feed end wall and exit end wall portion may form angles with respect to floor 102, as indicated. These angles may be the same or different, and generally may range from about 30 degrees to about 90 degrees, or from about 45 degrees to about 75 degrees. Decreasing these angles beyond these ranges may require more floor space for the melters, and/or more material of construction, both of which are generally undesirable. Increasing these angles may promote dead spaces in corners, which is also undesirable. During SCM operation a highly turbulent melt having a variable surface is formed inside the melter. In certain SCM embodiments, SC burner fuel and oxidant conduits may be positioned to emit fuel and oxidant into molten material in the SCM in a fashion so that the gases combust and penetrate the melt generally perpendicularly to floor panel 102. In other embodiments, one or more fuel or oxidant conduits may emit fuel or oxidant into the melt at an angle to floor 102, where the angle may be more or less than 45 degrees, but in certain embodiments may be 30 degrees, or 40 degrees, or 50 degrees, or 60 degrees, or 70 degrees, or 80 degrees.

The initial raw material may be introduced into the melter on a batch, semi-continuous or continuous basis. In some embodiments, a feeder may introduce the initial raw material into the SCM. Other embodiments may include a slanted or angled feed chute in which large pieces of feed material (such as basalt or other material) may be fed and optionally pre-heated by out going melter exhaust without becoming fluidized, such as disclosed in Applicant's U.S. Pat. No. 9,815,726, issued Nov. 14, 2017. In some embodiments a "batch blanket" may form along the feed end sidewall. Feed port 110 may be positioned above the average glass melt level. The amount of the initial raw material introduced into the melter is generally a function of, for example, the capacity and operating conditions of the melter as well as the rate at which the molten material is removed from the melter.

The initial raw material feedstock may include any material suitable for forming molten inorganic materials, such as glass, such as, for example, limestone, glass, sand, soda ash, feldspar, basalt or other rock wool forming material, and mixtures thereof. In one embodiment, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in Applicant's published U.S. application 2008/0276652. The initial raw material can be provided in any form such as, for example, relatively small particles, or in the case of rock wool or mineral wool manufacture, in large pieces 5 cm or more in diameter.

As noted herein, submerged combustion burners and burner panels may produce violent turbulence of the molten inorganic material in the SCM and may result in sloshing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure may include indirect measurement of melt temperature in the melter itself, as disclosed in Applicant's U.S. Pat. No. 9,096,453, using one or more thermocouples for monitoring and/or control of the melter, for example using a controller. A signal may be transmitted by wire or wirelessly from a thermocouple to a controller, which may control the melter by adjusting any number of parameters, for example feed rate of a feedstock feeder may be adjusted through a signal, and one or more of fuel and/or oxidant flow rates may be adjusted via a signal, it being understood that suitable transmitters and actuators, such as valves and the like, are not illustrated for clarity.

Submerged combustion melters may include a melter exit structure for discharging the molten glass or similar material. A melter exit structure may be positioned generally downstream of the melter exit end, and may fluidly and mechanically connect the melter vessel to a molten material conditioning channel, or other channel or structure (not illustrated). Melter exit structures may comprise a fluid-cooled transition channel, having generally rectangular cross-section in certain embodiments, although any other cross-section would suffice, such as hexagonal, trapezoidal, oval, circular, and the like. Regardless of cross-sectional shape, the fluid-cooled transition channel is configured to form a frozen layer or highly viscous layer, or combination thereof, of material being melted on inner surfaces of the fluid-cooled transition channel and thus protect melter exit structure from the mechanical energy imparted from the melter vessel to the melter exit structure. A melter exit structure may in certain embodiments comprise an essentially rectangular, fluid-cooled, ceramic or metallic box having a length, a width, a height. In these embodiments, length may range from about 5 to about 50 percent, or from about 10 to about 40 percent, of the entire length of the melter apparatus. The width of melter exit structure may be the same as the width of the SCM, or may be less or more than the width of the SCM. The height may range from about 5 to about 50 percent, or from about 10 to about 40 percent, of the entire height of the melter apparatus, measured from floor to ceiling. Melter length, width and height depend primarily on the amount of raw material to be fed, the amount of molten material to be produced, and the desired throughputs mentioned herein.

Certain fluid-cooled burner panels of the present disclosure may include an overlapping refractory material layer on the non-fluid-cooled portion that is exposed to molten material. In certain embodiments the overlapping refractory material may comprise a seamless insert of dense chrome, molybdenum, or other dense ceramic or metallic material. The dense chrome or other refractory material may also be inserted into the melter exit structure and may provide a seamless transition form the melter vessel to a conditioning channel (not illustrated).

Figure 7B:
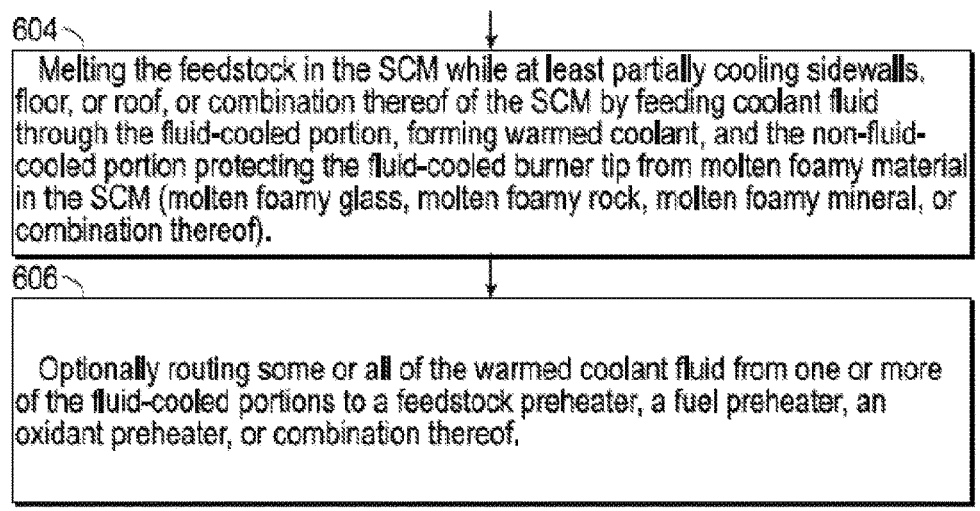

FIGS. 7A and 7B is a schematic logic diagram of a method embodiment 600 of melting non-metallic inorganic materials in accordance with the present disclosure. In embodiment 600, the method comprises (box 602) feeding the feedstock into a submerged combustion melter comprising a combustion burner panel comprising (a) a panel body comprising a fluid-cooled portion and a protective non-fluid cooled portion, an exterior surface defined by the fluid-cooled portion, and an interior surface defined by the protective non-fluid cooled portion, wherein exterior and interior refer to an SCM in which the panel is installed; (b) the fluid-cooled portion having at least one burner support passage of diameter (d1) extending from the exterior surface to a seam where the fluid-cooled and protective non-fluid cooled portions meet supporting at least one fluid-cooled SC burner having a fluid-cooled burner tip (4) attached to a burner body (6), at least the fluid-cooled burner tip protrudes away from the seam, the protective non-fluid-cooled portion having corresponding at least one combustion products flow passage of diameter (d2)≤(d1); (c) the at least one fluid-cooled SC burner comprising (or consisting essentially of, or consisting of) (i) the burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, and a second internal conduit (14) substantially concentric with, and positioned internal of the first internal conduit, the second internal conduit (14) comprising a first end, a second end, and a longitudinal bore having a longitudinal axis, the external conduit (10) and first internal conduit (12) forming a first annulus (11) there between for passing a cooling fluid, the first internal conduit (12) and the second internal conduit (14) forming a second annulus (13) there between for passing the cooling fluid, and a third internal conduit (15) configured to form a third annulus between the second (14) and third (15) internal conduits, the burner body comprising fuel and oxidant inlet ports near the second ends of the conduits; and (ii) the burner tip (4) defined by an inner wall (28) and an outer wall (30) connected via a half-toroid crown (32), the outer wall (30) removably fixed to the first end of the external conduit (10) via an outer connection, and the inner wall (28) removably fixed to the first end of the second internal conduit (14) via an inner connection, the burner tip (4) comprising a generally central burner tip flow passage configured to pass a combustible mixture therethrough, the generally central burner tip flow passage defined by the inner wall (28); melting the feedstock in the SCM while at least partially cooling sidewalls, floor, or roof, or combination thereof of the SCM by feeding coolant fluid through the fluid-cooled portion, forming warmed coolant, and the non-fluid-cooled portion protecting the fluid-cooled burner tip from molten foamy material in the SCM (molten foamy glass, molten foamy rock, molten foamy mineral, or combination thereof) (box 604); and optionally routing some or all of the warmed coolant from one or more of the continuous flow submerged combustion melter cooling wall panels to a feedstock preheater, a fuel preheater, an oxidant preheater, or combination thereof (box 606).

Submerged combustion burners useful in the SC melter apparatus described herein include those described in U.S. Pat. Nos. 4,539,034; 3,170,781; 3,237,929; 3,260,587; 3,606,825; 3,627,504; 3,738,792; 3,764,287; and 7,273,583, and Applicant's U.S. Pat. Nos. 8,875,544 and 9,032,760. SC burners such as described in Applicant's co-pending U.S. patent application Ser. Nos. 14/785,327; 14/785,325; 14/785,330; and Ser. No. 14/785,324, all filed Oct. 17, 2015 (the first featuring reduced stress and thermal fatigue of the top toroid shape, the second featuring Pt/Rh or Cu alloy based burners tips and attachment to the remainder of the burner, usually carbon steel; and the third featuring burners having improved fuel and oxidant mixing; and the fourth featuring a toroid burner tip and protective cap for same) may be used, although the protective material of the non-fluid-cooled portion is intended to reduce the need for exotic (and expensive) materials. Other SC burners that may be used include the SC burners described in Applicant's U.S. patent application Ser. No. 14/904,662, filed Jan. 1, 2016 (featuring attaching a toroid burner tip to the body of the burner using interlocking rings) and U.S. Pat. No. 9,777,922, issued Oct. 3, 2017 (featuring a concave burner tip crown); Ser. No. 14/778,206, filed Sep. 18, 2015 (featuring a spin-formed or stamped burner tip); the SC burners and burner panels described in Applicant's U.S. patent application Ser. Nos. 14/838,148 and 14/838,229, both filed Aug. 27, 2015; and the SC burners described in Applicant's U.S. patent application Ser. No. 15/246,705, filed Aug. 25, 2016.

Melter apparatus in accordance with the present disclosure may also comprise one or more wall-mounted sub-merged combustion burners, and/or one or more roof-mounted burners (not illustrated). Roof-mounted burners may be useful to pre-heat the melter apparatus melting zones, and serve as ignition sources for one or more submerged combustion burners and/or burner panels. Melter apparatus having only wall-mounted, submerged-combustion burners or burner panels are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of batch particles to the exhaust, one or more roof-mounted burners could be used to form a curtain to prevent particulate carryover. In certain embodiments, all submerged combustion burners and burner panels are oxy/fuel burners or oxy-fuel burner panels (where "oxy" means oxygen, or oxygen-enriched air, as described earlier), but this is not necessarily so in all embodiments; some or all of the submerged combustion burners or burner panels may be air/fuel burners. Furthermore, heating may be supplemented by electrical heating in certain embodiments, in certain melter zones.

Suitable materials for the non-fluid-cooled portion of panel bodies of burner panels, and burner conduits in certain embodiments, include fused zirconia ($ZrO_2$), fused cast AZS (alumina-zirconia-silica), rebonded AZS, or fused cast alumina ($Al_2O_3$). The melter geometry and operating temperature, burner body panel geometry, and type of glass or other product to be produced, may dictate the choice of a particular material, among other parameters.

The term "fluid-cooled" means use of a coolant fluid (heat transfer fluid) to transfer heat away from a burner or burner panel. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, water, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more fuel and/or oxidant conduits in the SCM and/or flow channel(s) downstream thereof may be adjustable with respect to direction of flow of the fuel or oxidant or both. Adjustment may be via automatic, semi-automatic, or manual control. Certain system embodiments may comprise a mount that mounts the fuel or oxidant conduit in a burner panel of the SCM and/or flow channel comprising a refractory, or refractory-lined ball joint. Other mounts may comprise rails mounted in slots in the wall or roof. In yet other embodiments the fuel and/or oxidant conduits may be mounted outside of the melter or channel, on supports that allow adjustment of the fuel or oxidant flow direction. Useable supports include those comprising ball joints, cradles, rails, and the like.

Certain SCMs and method embodiments of this disclosure may include fluid-cooled panels such as disclosed in Applicant's U.S. Pat. No. 8,769,992. Certain systems and processes of the present disclosure may utilize measurement and control schemes such as described in Applicant's U.S. Pat. No. 9,096,453, and/or feed batch densification systems and methods as described in Applicant's co-pending U.S. Pat. No. 9,643,869, issued May 9, 2017. Certain SCMs and processes of the present disclosure may utilize devices for delivery of treating compositions such as disclosed in Applicant's U.S. Pat. No. 8,973,405.

Certain SCMs and process embodiments of this disclosure may be controlled by one or more controllers. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner panel, temperature of the primary oxidant as it enters the burner panel, temperature of the molten product, pressure of the primary oxidant entering the burner panel, humidity of the oxidant, burner panel geometry, combustion ratio, and combinations thereof. Certain SCMs and processes of this disclosure may also measure and/or monitor feed rate of batch or other feedstock materials, such as rock wool or mineral wool feedstock, glass batch, cullet, mat or wound roving and treatment compositions, mass of feed, and use these measurements for control purposes.

Oxidant and fuel conduits of burner panels of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. Use of high strength steel and other high strength materials may significantly reduce the conduit wall thickness required, reducing weight of the conduits and/or space required for conduits.

Protective materials for non-fluid-cooled portion 114 may comprise noble metals and/or other exotic corrosion and/or fatigue-resistant materials, for example mixed into a refractory slurry that is then applied to the fluid-cooled portion as a moldable paste or slurry of protective material, or a thin (<0.5 inch, 1.3 cm) noble metal layer or layers may be applied over a refractory layer or layers (in other words, a 100 percent noble or other exotic corrosion and/or fatigue-resistant material layer or layer), together forming the non-fluid-cooled portion of the panels. Suitable noble metals include platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. If mixed into a refractory slurry that is then applied to the fluid-cooled portion as a moldable paste or slurry of protective material, the noble or other exotic corrosion and/or fatigue-resistant materials would not be present in quantities over an amount that would make their use exorbitantly expensive, and in most embodiments less than about 20 percent, or less than about 15 percent, or less than about 5 percent by weight. The noble or other exotic corrosion and/or fatigue-resistant materials may be randomly or non-randomly applied; for example, a refractory layer nearer the molten material in the SCM may have a higher percentage of noble or other exotic corrosion and/or fatigue-resistant material than layers nearer the burner tips.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of (or consisting of) a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, or consisting of 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of fuel and oxidant used and type of melt to be produced. The skilled artisan, having knowledge of the particular application, pressures, temperatures, and available materials, will be able design the most cost effective, safe, and operable burner panels for each particular application without undue experimentation.

The terms "corrosion resistant" and "fatigue resistant" as used herein refer to two different failure mechanisms that may occur simultaneously, and it is theorized that these failure mechanisms may actually influence each other in profound ways. Preferably, burner panels will have a satisfactory service life of at least 12 months under conditions existing in a continuously operating SCM. As used herein the SCM may comprise a floor, a roof, and a sidewall structure connecting the floor and roof defining an internal space, at least a portion of the internal space comprising a melting zone, and one or more combustion burner panels of this disclosure in either the floor, the roof, or the sidewall structure, or any two or more of these, producing combustion gases and configured to emit the combustion gases from a position under a level of, and positioned to transfer heat to and produce, a turbulent molten mass of glass containing bubbles in the melting zone.

The total quantities of fuel and oxidant used by burner panels of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner panel embodiments of the present disclosure depends on the burner panel geometry used, but generally is at least about 15 meters/second (m/s). The upper limit of fuel velocity depends primarily on the desired penetration of flame and/or combustion products into the glass melt and the geometry of the burner panel; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Baffles may be provided extending from the roof, and/or in the melter exhaust stack, or transition region between the melter and stack, in order to safeguard against this. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft./sec at 400 scfh flow rate.

Embodiments disclosed herein include:

A: A submerged combustion burner panel, or section thereof, comprising (or consisting essentially of, or consisting of):
  (a) a panel body comprising a fluid-cooled portion and a protective non-fluid cooled portion, an exterior surface defined by the fluid-cooled portion, and an interior surface defined by the protective non-fluid cooled portion, wherein exterior and interior refer to an SCM in which the panel is installed;
  (b) the fluid-cooled portion having at least one burner support passage of diameter (d1) extending from the exterior surface to a seam where the fluid-cooled and protective non-fluid cooled portions meet supporting at least one fluid-cooled SC burner having a fluid-cooled burner tip (4) attached to a burner body (6), at least the fluid-cooled burner tip protrudes away from the seam, the protective non-fluid-cooled portion having corresponding at least one combustion products flow passage of diameter (d2)≤(d1);
  (c) the at least one fluid-cooled SC burner comprising (or consisting essentially of, or consisting of)
    (i) the burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, and a second internal conduit (14) substantially concentric with, and positioned internal of the first internal conduit, the second internal conduit (14) comprising a first end, a second end, and a longitudinal bore having a longitudinal axis, the external conduit (10) and first internal conduit (12) forming a first annulus (11) there between for passing a cooling fluid, the first internal conduit (12) and the second internal conduit (14) forming a second annulus (13) there between for passing the cooling fluid, and a third internal conduit (15) configured to form a third annulus between the second (14) and third (15) internal conduits, the burner body comprising fuel and oxidant inlet ports near the second ends of the conduits; and
    (ii) the burner tip (4) defined by an inner wall (28) and an outer wall (30) connected via a half-toroid crown (32), the outer wall (30) removably fixed to the first end of the external conduit (10) via an outer connection, and the inner wall (28) removably fixed to the first end of the second internal conduit (14) via an inner connection, the burner tip (4) comprising a generally central burner tip flow passage configured to pass a combustible mixture therethrough, the generally central burner tip flow passage defined by the inner wall (28).

B: A submerged combustion burner panel, or section thereof, comprising (or consisting essentially of, or consisting of):
  (a) a panel body devoid of 90 degree or less angles comprising a fluid-cooled portion and a protective non-fluid cooled portion, an exterior surface of the panel body defined by the fluid-cooled portion, and an interior surface defined by the protective non-fluid cooled portion;
  (b) the fluid-cooled portion having at least one burner support passage of diameter (d1) extending from the exterior surface to a seam where the fluid-cooled and protective non-fluid cooled portions meet supporting at least one fluid-cooled SC burner having a fluid-cooled burner tip (4) attached to a burner body (6), at least the fluid-cooled burner tip protrudes away from the seam, the protective non-fluid-cooled portion having corresponding at least one combustion products flow passage of diameter (d2)≤(d1);
  (c) the at least one fluid-cooled SC burner comprising (or consisting essentially of, or consisting of)
    (i) the burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, and a second internal conduit (14) substantially concentric with, and positioned internal of the first internal conduit, the second internal conduit (14) comprising a first end, a second end, and a longitudinal bore having a longitudinal axis, the external conduit (10) and first internal conduit (12) forming a first annulus (11) there between for passing a cooling fluid, the first internal conduit (12) and the second internal conduit (14) forming a second annulus (13) there between for passing the cooling fluid, and a third internal conduit (15) configured to form a third annulus between the second (14) and third (15) internal conduits, the burner body comprising fuel and oxidant inlet ports near the second ends of the conduits; and
    (ii) the burner tip (4) defined by an inner wall (28) and an outer wall (30) connected via a crown (32), the outer wall (30) removably fixed to the first end of the external conduit (10) via an outer connection, and the inner wall (28) removably fixed to the first end of the second internal conduit (14) via an inner connection, the burner tip (4) comprising a generally central burner tip flow passage configured to pass a combustible mixture therethrough, the generally central burner tip flow passage defined by the inner wall (28).

Embodiments A and B may have at least one or more of the following additional elements in any combination: Element 1: the protective non-fluid cooled portion comprises a protective cover material applied to a major surface of the fluid-cooled panel opposite the exterior surface so that at least a circumferential and radial portion of the burner body and the outer wall (30) and crown (32) of the fluid-cooled burner tip are protected from molten or partially molten material that may include foam (molten glass, molten rock, molten mineral), the cover material defining the at least one combustion products flow passage of diameter (d2) defined by a cover material inner wall (51); Element 2: the protective cover material is applied to, stacked on, coated on, troweled on, or poured onto the major surface of the fluid-cooled panel opposite the exterior surface so that tips of the SC burners are protected from the molten material that may include foam (molten glass, molten rock, molten mineral) while leaving the corresponding at least one combustion products flow passage of diameter (d2)≤(d1); Element 3: the protective cover material comprises hard brick stacked onto the major surface of the fluid-cooled panel opposite the exterior surface; Element 4: the protective cover material comprises a moldable refractory coated on, troweled on, or poured onto the major surface of the fluid-cooled panel opposite the exterior surface; Element 5: the protective cover material comprises glass batch or cullet based material, or mixture or layered combination thereof, combined with a moldable refractory coated on, troweled on, or poured onto the major surface of the fluid-cooled panel opposite the exterior surface; Element 6: the protective cover material comprises basalt rock or mineral feedstock, or mixture or layered combination thereof, combined with a moldable refractory coated on, troweled on, or poured onto the major surface of the fluid-cooled panel opposite the exterior surface; Element 7: the fluid-cooled portion of the panel body is a continuous flow submerged combustion melter cooling wall panel; Element 8: the burner tip crown (32) and inner (28) and outer (30) walls comprising same or different corrosion resistant and fatigue resistant material, at least one of the corrosion and fatigue resistance being greater than material comprising the external conduit (10) under conditions experienced during submerged combustion melting of glass-forming, rock-forming, or mineral-forming materials; Element 9: each fluid-cooled burner tip consists of one or more noble metals; Element 10: a top surface of the fluid-cooled burner crown is at a distance (d3) from the seam; Element 11: the corresponding at least one combustion products flow passage of diameter (d2)≤(d1) has an inner surface angled away from a longitudinal axis through the fluid-cooled burner at an angle ranging from 0 degrees to about 45 degrees; Element 12: a distal end of the one or more fuel conduits extends away from the seam a distance (d4)< (d3), and the interior surface defined by the protective non-fluid cooled portion extends above the burner tip crown a distance (d5), where a ratio of (d5):(d3) ranges from about 0.5 to about 2; Element 13: the at least one combustion products flow passage defines a conical passage having a cone angle (α) to a burner longitudinal axis (A) ranging from 0 to about 45 degrees; Element 14: the at least one combustion products flow passage defines a conical passage having a cone angle (β) to a burner longitudinal axis (A) ranging from 0 to about 45 degrees Element 15: the at least one combustion products flow passage defines a cylindrical passage of constant diameter, and (d2)<(d1).

All of embodiments A and B may be installed in an SCM, and all may be used in methods of making molten products (glass products, mineral products, rock products) using the SCM. All of the SCM embodiments may employ one or more heat recovery schemes described herein, alone or in combination.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A submerged combustion burner panel, or section thereof, comprising:
    (a) a panel body comprising a fluid-cooled portion and a protective non-fluid cooled portion, an exterior surface defined by the fluid-cooled portion, and an interior surface defined by the protective non-fluid cooled portion, wherein exterior and interior refer to a submerged combustion melter in which the submerged combustion burner panel is installed;
    (b) the fluid-cooled portion having at least one burner support passage of diameter (d1) extending from the exterior surface to a seam where the fluid-cooled and protective non-fluid cooled portions meet supporting at least one fluid-cooled submerged combustion burner having a fluid-cooled burner tip (4) attached to a burner body (6), at least the fluid-cooled burner tip protrudes away from the seam, the protective non-fluid-cooled portion having corresponding at least one combustion products flow passage of diameter (d2)≤(d1);
    (c) the at least one fluid-cooled submerged combustion burner comprising
        (i) the burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, and a second internal conduit (14) substantially concentric with, and positioned internal of the first internal conduit, the second internal conduit (14) comprising a first end, a second end, and a longitudinal bore having a longitudinal axis, the external conduit (10) and first internal conduit (12) forming a first annulus (11) there between for passing a cooling fluid, the first internal conduit (12) and the second internal conduit (14) forming a second annulus (13) there between for passing the cooling fluid, and a third internal conduit (15) configured to form a third annulus between the second (14) and third (15) internal conduits, the burner body comprising fuel and oxidant inlet ports near the second ends of the conduits; and
        (ii) the burner tip (4) defined by an inner wall (28) and an outer wall (30) connected via a half-toroid crown (32), the outer wall (30) removably fixed to the first end of the external conduit (10) via an outer connection, and the inner wall (28) removably fixed to the first end of the second internal conduit (14) via an inner connection, the burner tip (4) comprising a generally central burner tip flow passage configured to pass a combustible mixture therethrough, the generally central burner tip flow passage defined by the inner wall (28), a top surface of the half-toroid crown (32) is at a distance (d3) from the seam, a distal end of the third internal conduit extends away from the seam a distance (d4)<(d3), and the interior surface defined by the protective non-fluid cooled portion extends above the burner tip crown a distance (d5), where a ratio of (d5):(d3) ranges from about 0.5 to about 2.

2. The submerged combustion burner panel of claim 1 wherein the protective non-fluid cooled portion comprises a protective cover material applied to a major surface of the fluid-cooled panel opposite the exterior surface so that at least a circumferential and radial portion of the burner body and the outer wall (30) and crown (32) of the fluid-cooled burner tip are protected from molten or partially molten material that may include foam, the protective cover material defining the at least one combustion products flow passage of diameter (d2) defined by a cover material inner wall (51).

3. The submerged combustion burner panel of claim 2 wherein the protective cover material is applied to, stacked on, coated on, troweled on, or poured onto the major surface of the fluid-cooled panel opposite the exterior surface so that tips of the submerged combustion burners are protected from the molten or partially molten material that may include foam (molten glass, molten rock, molten mineral) while leaving the corresponding at least one combustion products flow passage of diameter (d2)≤(d1).

4. The submerged combustion burner panel of claim 3 wherein the protective cover material comprises hard brick stacked onto the major surface of the fluid-cooled panel opposite the exterior surface.

5. The submerged combustion burner panel of claim 3 wherein the protective cover material comprises a moldable refractory coated on, troweled on, or poured onto the major surface of the fluid-cooled panel opposite the exterior surface.

6. The submerged combustion burner panel of claim 3 wherein the protective cover material comprises glass batch or cullet based material, or mixture or layered combination thereof, combined with a moldable refractory coated on, troweled on, or poured onto the major surface of the fluid-cooled panel opposite the exterior surface.

7. The submerged combustion burner panel of claim 3 wherein the protective cover material comprises basalt rock or mineral feedstock, or mixture or layered combination thereof, combined with a moldable refractory coated on, troweled on, or poured onto the major surface of the fluid-cooled panel opposite the exterior surface.

8. The submerged combustion burner panel of claim 1 wherein the fluid-cooled portion of the panel body is a continuous flow submerged combustion melter cooling wall panel.

9. The submerged combustion burner panel of claim 1, the burner tip crown (32) and inner (28) and outer (30) walls comprising same or different corrosion resistant and fatigue resistant material, at least one of the corrosion and fatigue resistance being greater than material comprising the external conduit (10) under conditions experienced during submerged combustion melting of glass-forming, rock-forming, or mineral-forming materials.

10. The submerged combustion burner panel of claim 9 wherein each fluid-cooled burner tip consists of one or more noble metals.

11. The submerged combustion burner panel of claim 1 wherein the corresponding at least one combustion products flow passage of diameter (d2)≤(d1) has an inner surface angled away from the longitudinal axis at an angle (α) ranging from 0.45 degrees to about 45 degrees.

12. The submerged combustion burner panel of claim 1 wherein the corresponding at least one combustion products flow passage of diameter (d2)≤(d1) has an inner surface angled toward the longitudinal axis at an angle (β) ranging from 0.45 degrees to about 45 degrees.

13. The submerged combustion burner panel of claim 1 wherein the at least one combustion products flow passage defines a conical passage having a cone angle (α) to a burner longitudinal axis (A) ranging from 0.45 to about 45 degrees.

14. The submerged combustion burner panel of claim 1 wherein the at least one combustion products flow passage defines a cylindrical passage of constant diameter, and (d2)<(d1).

15. A submerged combustion melter including a floor, a roof or ceiling, and a wall connecting the floor and roof, the floor or wall, or section of either of these, comprising the submerged combustion burner panel, or section thereof, of claim 1.

16. A method of melting non-metallic inorganic feedstock using a submerged combustion melter, the method comprising (a) feeding the feedstock into the submerged combustion melter of claim 15, and (b) melting the feedstock so that the fluid-cooled burner tip is protected from molten or partially molten material that may include foam (molten glass, molten rock, molten mineral).

17. A submerged combustion burner panel, or section thereof, comprising:
(a) a panel body devoid of 90 degree or less angles comprising a fluid-cooled portion and a protective non-fluid cooled portion, an exterior surface of the panel body defined by the fluid-cooled portion, and an interior surface defined by the protective non-fluid cooled portion;
(b) the fluid-cooled portion having at least one burner support passage of diameter (d1) extending from the exterior surface to a seam where the fluid-cooled and protective non-fluid cooled portions meet supporting at least one fluid-cooled SC burner having a fluid-cooled burner tip (4) attached to a burner body (6), at least the fluid-cooled burner tip protrudes away from the seam, the protective non-fluid-cooled portion having corresponding at least one combustion products flow passage of diameter (d2)≤(d1);
(c) the at least one fluid-cooled submerged combustion burner comprising
(i) the burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, and a second internal conduit (14) substantially concentric with, and positioned internal of the first internal conduit, the second internal conduit (14) comprising a first end, a second end, and a longitudinal bore having a longitudinal axis, the external conduit (10) and first internal conduit (12) forming a first annulus (11) there between for passing a cooling fluid, the first internal conduit (12) and the second internal conduit (14) forming a second annulus (13) there between for passing the cooling fluid, and a third internal conduit (15) configured to form a third annulus between the second (14) and third (15) internal conduits, the burner body comprising fuel and oxidant inlet ports near the second ends of the conduits; and
(ii) the burner tip (4) defined by an inner wall (28) and an outer wall (30) connected via a crown (32), the outer wall (30) removably fixed to the first end of the external conduit (10) via an outer connection, and the inner wall (28) removably fixed to the first end of the second internal conduit (14) via an inner connection, the burner tip (4) comprising a generally central burner tip flow passage configured to pass a combustible mixture therethrough, the generally central burner tip flow passage defined by the inner wall (28), a top surface of the half-toroid crown (32) is at a distance (d3) from the seam, a distal end of the third internal conduit-extends away from the seam a distance (d4)<(d3), and the interior surface defined by the protective non-fluid cooled portion extends above the burner tip crown a distance (d5), where a ratio of (d5):(d3) ranges from about 0.5 to about 2.

18. The submerged combustion burner panel of claim 17 wherein the protective non-fluid cooled portion comprises a protective cover material applied to a major surface of the fluid-cooled panel opposite the exterior surface so that at least a circumferential and radial portion of the burner body and the outer wall (30) and crown (32) of the fluid-cooled burner tip are protected from molten or partially molten material that may include foam (molten glass, molten rock, molten mineral), the cover material defining the at least one combustion products flow passage of diameter (d2) defined by a cover material inner wall (51).

19. The submerged combustion burner panel of claim 18 wherein the protective cover material is applied to, stacked on, coated on, troweled on, or poured onto the major surface of the fluid-cooled panel opposite the exterior surface so that tips of the submerged combustion burners are protected from the molten or partially molten material that may include foam (molten glass, molten rock, molten mineral) while leaving the corresponding at least one combustion products flow passage of diameter (d2)≤(d1).

20. The submerged combustion burner panel of claim 19 wherein the protective cover material comprises hard brick stacked onto the major surface of the fluid-cooled panel opposite the exterior surface.

21. The submerged combustion burner panel of claim 19 wherein the protective cover material comprises a moldable refractory coated on, troweled on, or poured onto the major surface of the fluid-cooled panel opposite the exterior surface.

22. The submerged combustion burner panel of claim 19 wherein the protective cover material comprises glass batch or cullet based material, or mixture or layered combination thereof, combined with a moldable refractory coated on, troweled on, or poured onto the major surface of the fluid-cooled panel opposite the exterior surface.

23. The submerged combustion burner panel of claim 19 wherein the protective cover material comprises basalt rock or mineral feedstock, or mixture or layered combination thereof, combined with a moldable refractory coated on, troweled on, or poured onto the major surface of the fluid-cooled panel opposite the exterior surface.

24. The submerged combustion burner panel of claim 17 wherein the fluid-cooled portion of the panel body is a continuous flow submerged combustion melter cooling wall panel.

25. The submerged combustion burner panel of claim 17, the burner tip crown and inner and outer walls comprising same or different corrosion resistant and fatigue resistant material, at least one of the corrosion and fatigue resistance being greater than material comprising the external conduit under conditions experienced during submerged combustion melting of glass-forming, rock-forming, or mineral-forming materials.

26. The submerged combustion burner panel of claim 25 wherein each fluid-cooled burner tip consists of one or more noble metals.

27. The submerged combustion burner panel of claim 17 wherein the corresponding at least one combustion products flow passage of diameter (d2)≤(d1) has an inner surface angled away from the longitudinal axis at an angle (α) ranging from 0.45 degrees to about 45 degrees.

28. The submerged combustion burner panel of claim 17 wherein the corresponding at least one combustion products flow passage of diameter (d2)≤(d1) has an inner surface angled toward the longitudinal axis at an angle (β) ranging from 0.45 degrees to about 45 degrees.

29. The submerged combustion burner panel of claim 17 wherein the at least one combustion products flow passage defines a conical passage having a cone angle (α) to a burner longitudinal axis (A) ranging from 0.45 to about 45 degrees.

30. The submerged combustion burner panel of claim 17 wherein the at least one combustion products flow passage defines a cylindrical passage, and (d2)<(d1).

31. A submerged combustion melter including a floor, a roof or ceiling, and a wall connecting the floor and roof, the floor or wall, or section of either of these, comprising the submerged combustion burner panel, or section thereof, of claim 17.

32. A method of melting non-metallic inorganic feedstock using a submerged combustion melter, the method comprising (a) feeding the feedstock into the submerged combustion melter of claim 31, and (b) melting the feedstock so that the fluid-cooled burner tip is protected from molten or partially molten material (molten glass, molten rock, molten mineral).

\* \* \* \* \*